(12) United States Patent
Yang et al.

(10) Patent No.: US 11,121,843 B2
(45) Date of Patent: *Sep. 14, 2021

(54) METHOD AND DEVICE FOR TRANSMITTING SIGNAL IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,684

(22) Filed: Aug. 25, 2020

(65) Prior Publication Data

US 2020/0389278 A1  Dec. 10, 2020

Related U.S. Application Data

(63) Continuation of application No. 15/577,710, filed as application No. PCT/KR2016/007150 on Jul. 1, 2016, now Pat. No. 10,848,291.
(Continued)

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04L 1/1861* (2013.01);
(Continued)

(58) Field of Classification Search
None
See application file for complete search history.

(56) References Cited

U.S. PATENT DOCUMENTS

2012/0039280 A1  2/2012 Chen et al.
2012/0106407 A1  5/2012 Papasakellariou et al.
(Continued)

FOREIGN PATENT DOCUMENTS

CN  102647261  8/2012
CN  103516499  1/2014
(Continued)

OTHER PUBLICATIONS

Huawei, HiSilicon, "HARQ-ACK Codebook determination for carrier aggregation enhancement beyond 5 carriers," 3GPP TSG-RAN WG1 #82, R1-153771, Aug. 2015, 7 pages.
(Continued)

*Primary Examiner* — Faruk Hamza
*Assistant Examiner* — Cassandra L Decker
(74) *Attorney, Agent, or Firm* — Lee, Hong, Degerman, Kang & Waimey

(57) ABSTRACT

The present invention relates to a wireless communication system. Specifically, the present invention relates to a method for transmitting, by a terminal, an HARQ-ACK in a CA wireless communication system and a device therefor, the method comprising the steps of: receiving a first PDCCH including a first DAI and a second DAI within SF #n-k; configuring an HARQACK payload using the first DAI and the second DAI; and transmitting the HARQ-ACK payload in SF on, wherein the value of the first DAI indicates the order values of scheduling of cell/SF units associated with the first PDCCH in SF #n-k, the order values of scheduling of cell/SF units are counted in a manner in which priority is given to cells in the cell/SF domain, and the value of the second DAI corresponds to a value obtained by accumulating the numbers of cells scheduled for the terminal by a DG DCI in each SF from the first SF to the SF, in which the first PDCCH is received, within SF #n-k (k #K).

16 Claims, 17 Drawing Sheets

Related U.S. Application Data

(60) Provisional application No. 62/187,276, filed on Jul. 1, 2015, provisional application No. 62/209,312, filed on Aug. 24, 2015, provisional application No. 62/216,354, filed on Sep. 9, 2015, provisional application No. 62/219,647, filed on Sep. 16, 2015, provisional application No. 62/232,433, filed on Sep. 24, 2015, provisional application No. 62/250,494, filed on Nov. 3, 2015, provisional application No. 62/254,761, filed on Nov. 13, 2015, provisional application No. 62/256,651, filed on Nov. 17, 2015, provisional application No. 62/260,343, filed on Nov. 27, 2015, provisional application No. 62/262,353, filed on Dec. 2, 2015, provisional application No. 62/262,887, filed on Dec. 3, 2015, provisional application No. 62/290,994, filed on Feb. 4, 2016.

(51) Int. Cl.
*H04W 72/04* (2009.01)
*H04W 72/12* (2009.01)
*H04L 1/16* (2006.01)
*H04L 1/12* (2006.01)

(52) U.S. Cl.
CPC ............... *H04L 5/00* (2013.01); *H04L 5/001* (2013.01); *H04W 72/042* (2013.01); *H04W 72/0413* (2013.01); *H04W 72/12* (2013.01); *H04L 1/1664* (2013.01); *H04L 2001/125* (2013.01)

(56) References Cited

U.S. PATENT DOCUMENTS

| | | | |
|---|---|---|---|
| 2012/0207109 | A1 | 8/2012 | Pajukoski et al. |
| 2012/0320805 | A1 | 12/2012 | Yang et al. |
| 2013/0215807 | A1 | 8/2013 | Yang et al. |
| 2013/0258914 | A1 | 10/2013 | Seo et al. |
| 2013/0336160 | A1 | 12/2013 | Yin et al. |
| 2014/0003302 | A1 | 1/2014 | Han et al. |
| 2014/0169242 | A1 | 6/2014 | Yang et al. |
| 2015/0063179 | A1 | 3/2015 | Yang et al. |
| 2015/0131494 | A1 | 5/2015 | He et al. |
| 2015/0200751 | A1 | 7/2015 | Yin et al. |
| 2016/0212734 | A1 | 7/2016 | He et al. |
| 2016/0255649 | A1 | 9/2016 | Kusashima et al. |
| 2016/0344529 | A1 | 11/2016 | Lee et al. |
| 2017/0012757 | A1 | 1/2017 | Suzuki et al. |
| 2017/0105198 | A1 | 4/2017 | Fu et al. |
| 2017/0201988 | A1 | 7/2017 | Seo et al. |
| 2017/0366323 | A1 | 12/2017 | Ahn et al. |
| 2018/0159675 | A1 | 6/2018 | Yang et al. |

FOREIGN PATENT DOCUMENTS

| | | |
|---|---|---|
| CN | 104604177 | 5/2015 |
| JP | 2013535939 | 9/2013 |
| JP | 2014519252 | 8/2014 |
| JP | 2017017371 | 1/2017 |
| KR | 1020130131328 | 12/2013 |
| KR | 1020140034803 | 3/2014 |
| WO | 2012060628 | 5/2012 |
| WO | 2012/154013 | 11/2012 |
| WO | 2013051913 | 4/2013 |
| WO | 2013105837 | 7/2013 |
| WO | 2014017877 | 1/2014 |

OTHER PUBLICATIONS

Japan Patent Office Application Serial No. 2019-172553, Office Action dated Aug. 4, 2020, 4 pages.
European Patent Office Application Serial No. 16818297.0, Search Report dated Jan. 30, 2019, 10 pages.
European Patent Office Application Serial No. 16818298.8, Search Report dated Jan. 30, 2019, 10 pages.
Catt, et al., "TDD ACK/NACK Transmission on PUSCH", 3GPP TSG RAN WG1 Meeting #65, R1-111798, May 2011, 8 pages.
U.S. Appl. No. 16/597,728, Office Action dated Jul. 17, 2020, 10 pages.
3rd Generation Partnership Project (3GPP), "Technical Specification Group Radio Access Network; Evolved Universal Terrestrial Radio Access (E-UTRA); Physical layer procedures (Release 12)," 3GPP TS 36.213 V12.5.0, Mar. 2015, 239 pages.
3rd Generation Partnership Project (3GPP), "Technical Specification Group Radio Access Network; Evolved Universal Terrestrial Radio Access (E-UTRA); Multiplexing and channel coding (Release 11)," 3GPP TS 36.212 V11.3.0, Jun. 2013, 89 pages.
PCT International Application No. PCT/KR2016/007149, Written Opinion of the International Searching Authority dated Oct. 17, 2016, 21 pages.
PCT International Application No. PCT/KR2016/007150, Written Opinion of the International Searching Authority dated Oct. 28, 2016, 19 pages.
Intel, "HARQ-ACK feedback for CA with up to 32 CCs", 3GPP TSG RAN WG1 Meeting #81, R1-152625, May 2015, 4 pages.
Nokia, "Dynamic adaptation of HARQ-ACK feedback size and PUCCH", 3GPP TSG RAN WG1 Meeting #81, R1-152810, May 2015, 3 pages.
Huawei et al., "Harq-Ack Codebook size determination and fallback operation for up to 32 component carriers", 3GPP TSG RAN WG1 Meeting #81, R1-152463, May 2015, 4 pages.
Samsung, "Discussion on HARQ-ACK bits reduction for eCA", 3GPP TSG RAN WG1 Meeting #81, R1-152852, May 2015, 4 pages.
U.S. Appl. No. 15/577,715, Office Action dated Jan. 7, 2019, 8 pages.
LG Electronics, "HARQ-ACK payload adaptation for Rel-13 CA", 3GPP TSG RAN WG1 Meeting #82bis, R1-155376, Oct. 2015, 8 pages.
United States Patent and Trademark Office Application U.S. Appl. No. 15/577,710, Office Action dated Jan. 31, 2019, 12 pages.
U.S. Appl. No. 15/577,710, Final Office Action dated Aug. 12, 2019, 14 pages.
U.S. Appl. No. 15/577,710, Office Action dated Jan. 9, 2020, 11 pages.
The State Intellectual Property Office of the People's Republic of China Application Serial No. 201680038186.7, Office Action dated Mar. 24, 2020, 13 pages.
The State Intellectual Property Office of the People's Republic of China Application Serial No. 201680034209.7, Office Action dated Apr. 2, 2020, 16 pages.
European Patent Office Application Serial No. 16818297.0, Office Action dated May 4, 2021, 8 pages.
LG Electronics, "Enhancements to UCI on PUSCH for Rel-13 CA," 3GPP TSG RAN WG-1 Meeting #81, R1-152719, May 2015, 4 pages.

FIG. 16

|  | Cell 1 | Cell 2 | Cell 3 | Cell 4 |
|---|---|---|---|---|
| SF #1 | c-DAI = 1 (t-DAI = 1) |  | c-DAI = 2 (t-DAI = 1) |  |
| SF #2 | c-DAI = 1 (t-DAI = 2) | c-DAI = 3 (t-DAI = 1) |  |  |

☐ scheduled     ▨ not scheduled

FIG. 17

|  | Cell 1 | Cell 2 | Cell 3 | Cell 4 |
|---|---|---|---|---|
| SF #1 | c-DAI = CG1 (t-DAI = 1) | c-DAI = CG1 (t-DAI = 1) |  |  |
| SF #2 |  |  |  | c-DAI = CG3 (t-DAI = 1) |
| SF #3 | c-DAI = CG3 (t-DAI = 2) |  | c-DAI = CG3 (t-DAI = 1) |  |

CG1 = {cell 1, 2}, CG2 = {cell 1, 2, 3}, CG3 = {cell 1, 2, 3, 4}

FIG. 18

|  | Cell 1 | Cell 2 | Cell 3 | Cell 4 | Cell 5 |
|---|---|---|---|---|---|
| SF #K | c-DAI = 1 | | c-DAI = 2 | c-DAI = 2 | |
| ⋮ | ⋮ | ⋮ | ⋮ | ⋮ | ⋮ |
| SF #N | | | c-DAI = 1 | c-DAI = 1 | c-DAI = 2 |

CG1 = {cell 1, 2}, CG2 = {cell 3, 4}, CG3 = {cell 5}

FIG. 19

|  | Cell 1 | Cell 2 | Cell 3 | Cell 4 |
|---|---|---|---|---|
| SF #1 | c-DAI = 1<br>total-DAI = 2 | c-DAI = 2<br>total-DAI = 2 | | |
| SF #2 | | | | c-DAI = 3<br>total-DAI = 3 |
| SF #3 | c-DAI = 4<br>total-DAI = 5 | | c-DAI = 5<br>total-DAI = 5 | |

☐ scheduled   ▨ not scheduled

METHOD AND DEVICE FOR TRANSMITTING SIGNAL IN WIRELESS COMMUNICATION SYSTEM

CROSS-REFERENCE TO RELATED APPLICATIONS

This application is a continuation of U.S. patent application Ser. No. 15/577,710, filed on Nov. 28, 2017, which is the National Stage filing under 35 U.S.C. 371 of International Application No. PCT/KR2016/007150, filed on Jul. 1, 2016, which claims the benefit of U.S. Provisional Application No. 62/187,276, filed on Jul. 1, 2015, 62/209,312, filed on Aug. 24, 2015, 62/216,354 filed on Sep. 9, 2015, 62/219,647, filed on Sep. 16, 2015, 62/232,433, filed on Sep. 24, 2015, 62/250,494, filed on Nov. 3, 2015, 62/254,761, filed on Nov. 13, 2015, 62/256,651, filed on Nov. 17, 2015, 62/260,343, filed on Nov. 27, 2015, 62/262,353, filed on Dec. 2, 2015, 62/262,887, filed on Dec. 3, 2015 and 62/290,994, filed on Feb. 4, 2016, the contents of which are all hereby incorporated by reference herein in their entireties.

TECHNICAL FIELD

The present invention relates to a wireless communication system, and more particularly to a method and apparatus for transmitting/receiving signals. The wireless communication system can support a carrier aggregation (CA).

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

An object of the present invention devised to solve the problem lies in a method and apparatus for efficiently transmitting signals in a wireless communication system. Another object of the present invention devised to solve the problem lies in a method and apparatus for efficiently controlling transmission of uplink signals.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In one aspect of the present invention, provided herein is a method for transmitting a hybrid automatic repeat request (HARQ-ACK) by a user equipment (UE) in a carrier aggregation (CA) wireless communication system, the method including receiving a first physical downlink control channel (PDCCH) including a downlink assignment index (DAI) and a second DAI in subframe (SF) #n-k, configuring an HARQ-ACK payload using the first DAI and the second DAI, and transmitting the HARQ-ACK payload in SF #n, wherein a value of the first DAI indicates a scheduling order value in units of cell/SF associated with the first PDCCH in SF #n-k, the scheduling order value in units of cell/SF being counted in a cell prioritized manner, wherein a value of the second DAI corresponds to a value obtained by accumulating, from a first SF to an SF in which the first PDCCH is received within SF #n-k (kEK), the number of cells scheduled for the UE in each SF by downlink grant (DG) downlink control information (DCI), wherein K: $\{k_0, k_1, \ldots k_{M-1}\}$ in each cell is given as follows:

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

In another aspect of the present invention, provided herein is a user equipment (UE) configured to transmit a hybrid automatic repeat request (HARQ-ACK) in a carrier aggregation (CA) wireless communication system, the UE including a radio frequency (RF) unit, and a processor, wherein the processor is configured to receive a first physical downlink control channel (PDCCH) including a downlink assignment index (DAI) and a second DAI in subframe (SF) #n-k, configure an HARQ-ACK payload using the first DAI and the second DAI, and transmit the HARQ-ACK payload in SF #n, wherein a value of the first DAI indicates a scheduling order value in units of cell/SF associated with the first PDCCH in SF #n-k, the scheduling order value in units of cell/SF being counted in a cell prioritized manner, wherein a value of the second DAI corresponds to a value obtained by accumulating, from a first SF to an SF in which the first PDCCH is received within SF #n-k (kEK), the number of cells scheduled for the UE in each SF by downlink grant (DG) downlink control information (DCI), wherein K: $\{k_0, k_1, \ldots k_{M-1}\}$ is given as follows:

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

Preferably, the first PDCCH may be received in a UE-specific search space (USS) of SF #n-k.

Preferably, the method may further include receiving a second PDCCH in a common search space (CSS) of SF #n-k, wherein the second PDCCH may not contain the second DAI.

Preferably, the first PDCCH may be (i) a PDCCH for scheduling a physical downlink shared channel (PDSCH) or (ii) a PDCCH indicating a semi-persistent scheduling release (SPS release).

Preferably, the HARQ-ACK payload may include an HARQ-ACK response to the PDSCH or an HARQ-ACK response to the PDCCH indicating the SPS release.

Advantageous Effects

As is apparent from the above description, exemplary embodiments of the present invention can provide a method and apparatus for efficiently transmitting signals in a wireless communication system. In more detail, the embodiments of the present invention efficiently can control transmission of uplink signals.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 16~19 exemplarily show a method for allocating DAI according to embodiments of the present invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
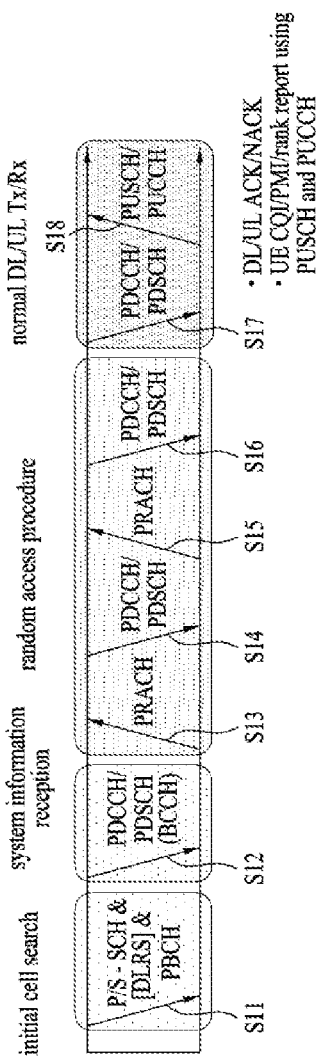
FIG. 1 is a conceptual diagram illustrating physical channels used in a 3GPP LTE system acting as an exemplary mobile communication system and a general method for transmitting a signal using the physical channels.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
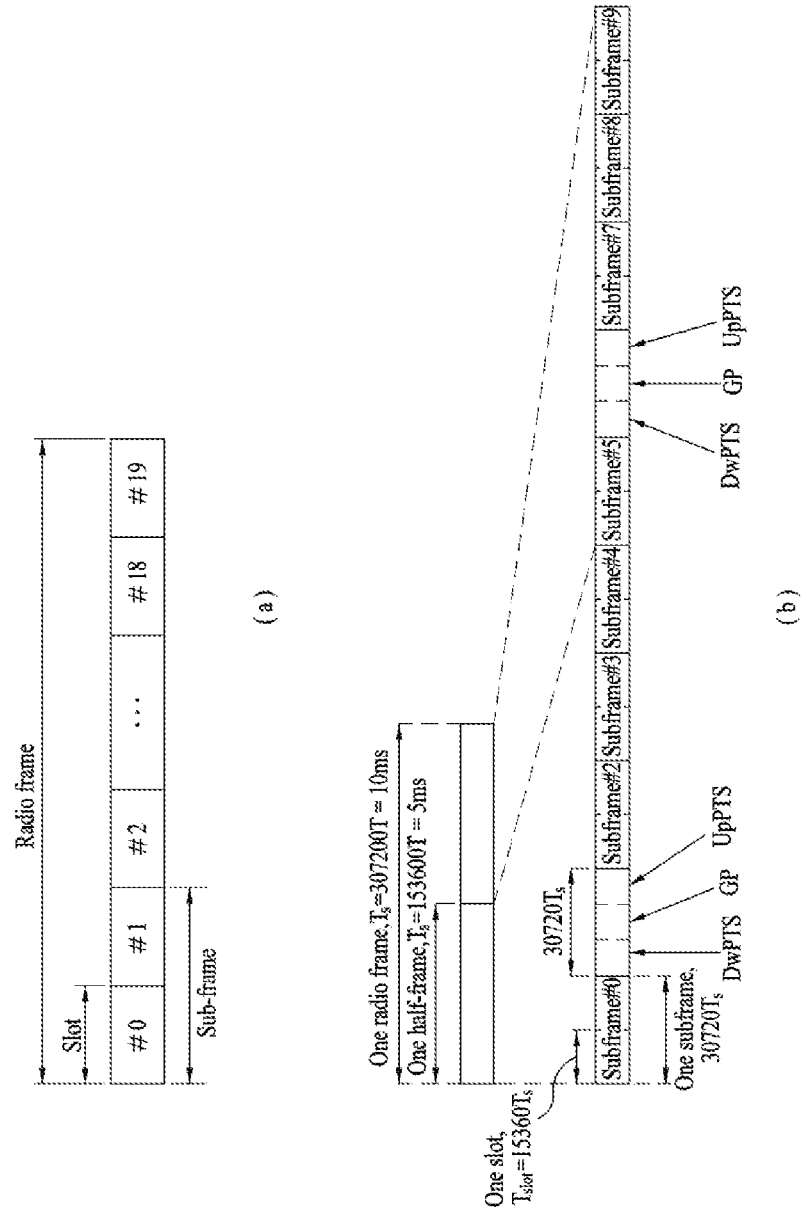
FIG. 2 is a diagram illustrating a structure of a radio frame.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 1(0) special subframe. Normal subframes are used for an uplink or a downlink according to UL-DL configuration. A subframe includes 2 slots.

Table 1 shows subframe configurations in a radio frame according to UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE. UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
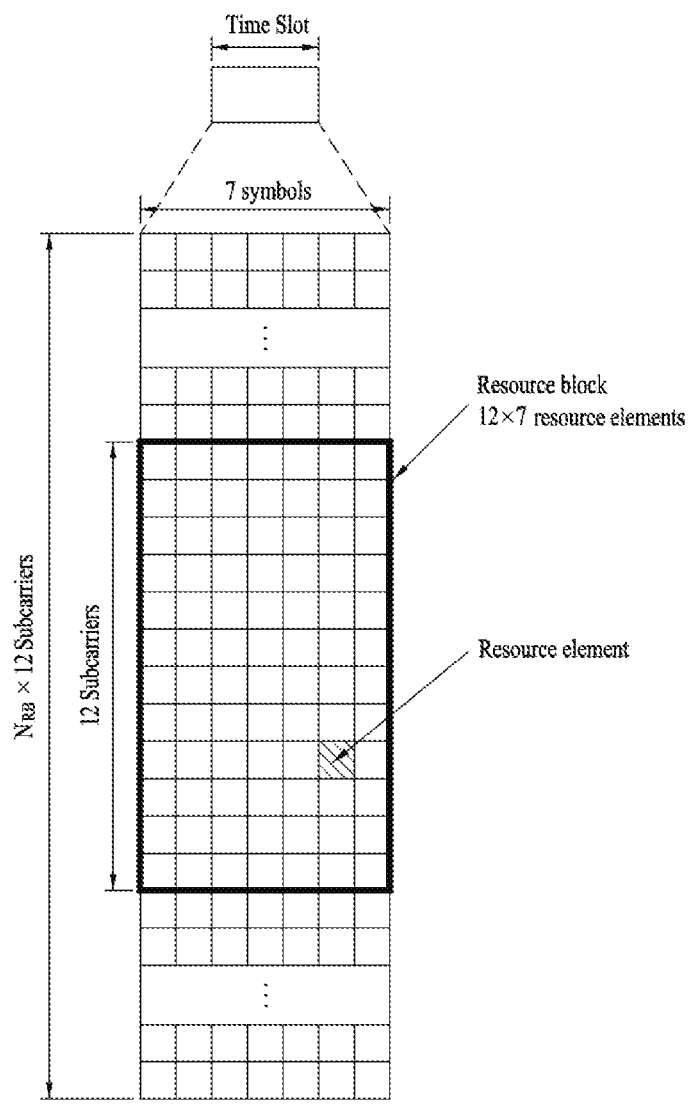
FIG. 3 exemplarily shows a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain. However, the present invention is not limited thereto. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 4:
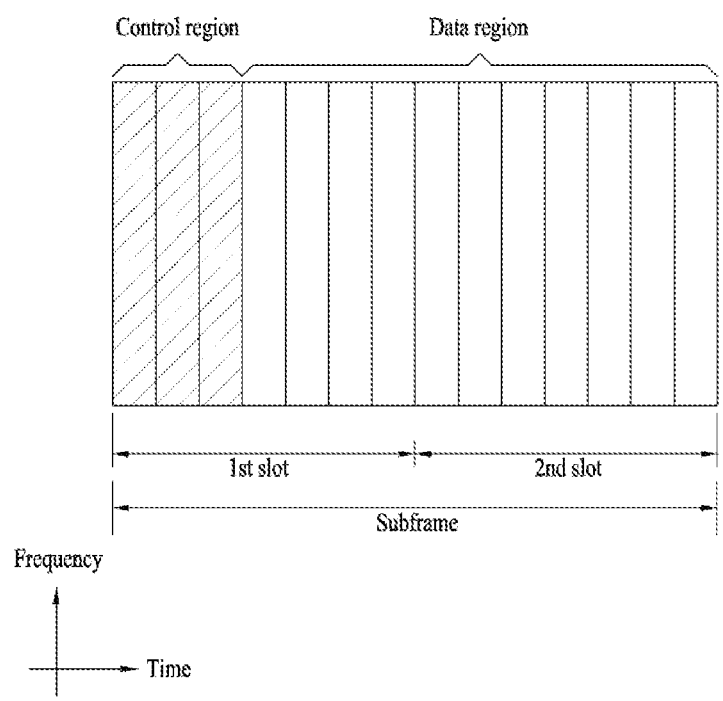
FIG. 4 illustrates a downlink frame structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UIE group.

Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary. A DCI format can be used to transmit control information of two or more types. For example, DCI format 0/1A is used to carry DCI format 0 or DCI format 1, which are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI, and generally, a plurality of PDCCHs is transmitted in a subframe. Each PDCCH is transmitted using one or more CCEs. One CCE corresponds to nine REGs, and one REG corresponds to four REs. Four QPSK symbols are mapped to each REG. The resource element occupied by the reference signal is not included in the REG. Thus, the number of REGs within a given OFDM symbol depends on the presence or absence of a cell-specific reference signal. The REG concept is also used for other downlink control channels (i.e., PDFICH and PHICH). As shown in Table 2, four PDCCH formats are supported.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by the BS according to the channel state. For example, one CCE may be required for a PDCCH for a UE (for example, adjacent to the BS) having a good downlink channel. However, in case of a PDCCH for a UE (for example, located near the cell edge) having a poor channel, eight CCEs may be required to obtain sufficient robustness. Additionally, the power level of the PDCCH may be adjusted according to the channel state.

In LTE, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. One PDCCH candidate corresponds to 1, 2, 4 or 8 CCEs according to the CCE set level. The BS transmits an actual PDCCH (DCI) on a PDCCH candidate in a search space and the UE monitors the search space to detect the PDCCH (DCI). Specifically, the UE attempts blind decoding (BD) on the PDCCH candidates in the search space.

In LTE, SSs for respective PDCCH formats may have different sizes. A dedicated SS and a common SS are defined. A dedicated SS (or UE-specific SS (USS)) and a common SS (Common SS (CSS)) are defined. The dedicated search space is configured for each individual UE, and all UEs are provided with information about the range of the common SS. The dedicated SS and the common SS may overlap for a given UE.

Since the SSs are small in size and may overlap each other, the base station may not be able to find a CCE resource for sending a PDCCH to all desired UEs in a given subframe. This is because CCE resources have already been allocated to other UEs, and there may be no more CCE resources for a specific UE in the search space of the specific UE (blocking). In order to minimize the possibility of blocking to be continued in the next subframe, a UE-specific hopping sequence is applied to the start position of the dedicated SS. Table 3 shows the sizes of common and dedicated SSs.

TABLE 3

| PDCCH format | Number of CCEs (n) | Number of candidates in common search space | Number of candidates in dedicated search space |
|---|---|---|---|
| 0 | 1 | — | 6 |
| 1 | 1 | — | 6 |
| 2 | 4 | 4 | 2 |
| 3 | 8 | 2 | 2 |

To put the computational load according to attempts of blind decoding under control, the UE does not simultaneously search all defined DCI formats. In general, in a dedicated search space, the UE always searches formats 0 and 1A. Formats 0 and 1A have the same size and are distinguished by flags in the message. In addition, the UE may be further required to receive another format (i.e., format 1, 1B or 2 depending on the PDSCH transmission mode set by the base station). In the common search space, the UE searches formats 1A and 1C. In addition, the UE may be configured to search format 3 or 3A. Formats 3 and 3A have the same size as in the case of format 0/1A, and are distinguished according to whether they have a CRC scrambled with another (common) identifier. Transmission modes and information content of DCI formats for configuring a multi-antenna technology are as follows.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using UE-specific reference signals
DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an uplink subframe structure used in LTE.

Figure 5:
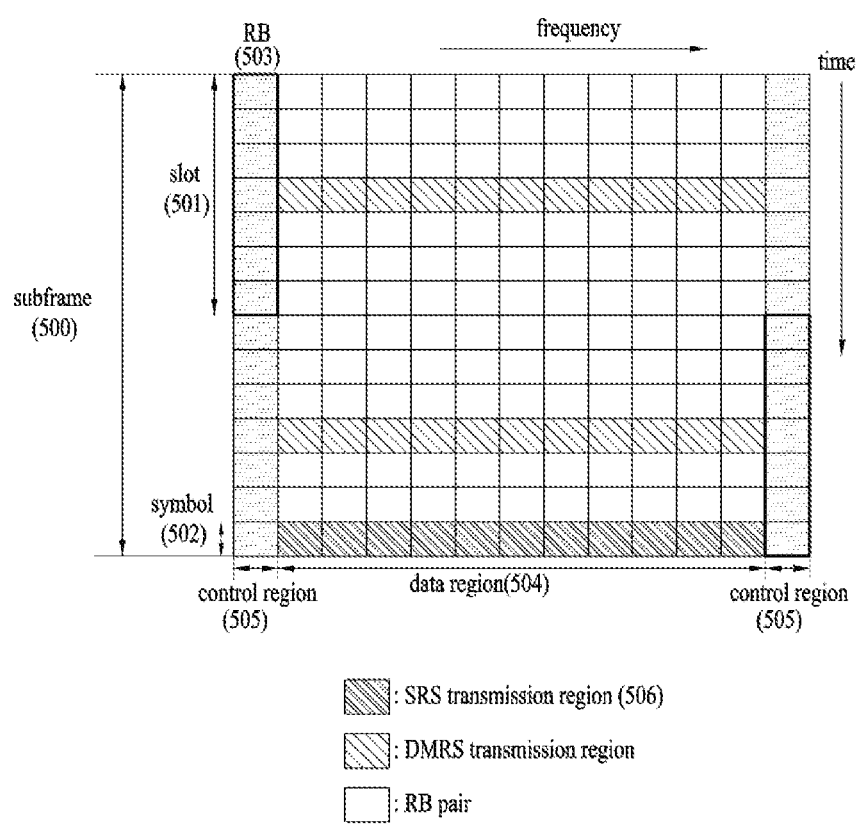
FIG. 5 illustrates an uplink subframe structure.

Referring to FIG. 5, a subframe 500 includes two 0.5 ms slots 501. When a normal CP is used, each slot includes 7 symbols 502 each corresponding to an SC-FDMA symbol. A resource block 503 is a resource allocation unit corresponding to 12 subcarriers in the frequency domain and to a slot in the time domain. The uplink subframe is divided into a data region 504 and a control region 505. The data region refers to a communication resource used for a UE to transmit data such as audio data, packets, etc. and includes a PUSCH (physical uplink shared channel). The control region refers to a communication resource used for the UE to transmit uplink control information (UCI) and includes a PUCCH (physical uplink control channel).

The PUCCH can be used to transmit the following control information.

SR (scheduling request): This is information used to request a UL-SCH resource and is transmitted using On-Off Keying (OOK) scheme.

HARQ ACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ-ACK response includes positive ACK (simply, ACK), negative ACK (NACK), DTX or NACK/DTX. Here, HARQ-ACK is used interchangeably with HARQ ACK/NACK and ACK/NACK.

CSI (channel state information): This is feedback information about a downlink channel. Feedback information regarding multiple input multiple output (MIMO) includes rank indicator (RI) and precoding matrix index (PMI). 20 bits are used for each subframe.

The quantity of control information that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE(-A).

TABLE 4

| PUCCH format | UCI (Uplink Control Information) |
|---|---|
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

An SRS is transmitted through the last SC-FDMA symbol of the subframe (506). SRSs of multiple UEs, transmitted through the same SC-FDMA symbol, can be discriminated according to frequency position/sequence. The SRS is transmitted aperiodically or periodically.

Figure 6:
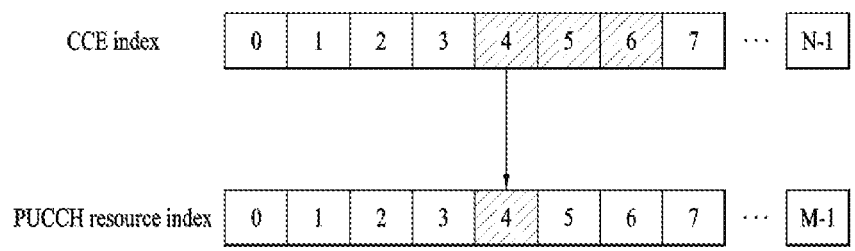
FIG. 6 shows an example for deciding PUCCH resources for ACK/NACK.

FIG. 6 shows an example for deciding PUCCH resources for ACK/NACK. In the LTE system, PUCCH resources for ACK/NACK are not pre-allocated to each UE, and several UEs located in the cell are configured to divisionally use several PUCCH resources at every time point. In more detail, PUCCH resources used for ACK/NACK transmission of a UE may correspond to a PDCCH that carries scheduling information of the corresponding DL data. The entire region to which a PDCCH is transmitted in each DL subframe is comprised of a plurality of Control Channel Elements (CCEs), and a PDCCH transmitted to the UE is comprised of one or more CCEs. The UE may transmit ACK/NACK through PUCCH resources (e.g., first CCE) from among CCEs constructing a PDCCH received by the UE.

Referring to FIG. 6, each block in a Downlink Component Carrier (DL CC) represents a CCE and each block in an Uplink Component Carrier (UL CC) indicates a PUCCH resource. Each PUCCH resource index may correspond to a PUCCH resource for an ACK/NACK signal. If information on a PDSCH is delivered on a PDCCH composed of CCEs #4~#6, as shown in FIG. 6, a UE transmits an ACK/NACK signal on PUCCH #4 corresponding to CCE #4, the first CCE of the PDCCH. FIG. 6 illustrates a case in which a maximum of M PUCCHs are present in the UL CC when a maximum of N CCEs exist in the DL CC. Though N may be identical to M (M=M), N may differ from M and CCEs may be mapped to PUCCHs in an overlapped manner.

load) generation, ACK/NACK resource allocation, etc.) (S504). ACK/NACK includes acknowledgement information about the PDSCH signal and/or an SPS release PDCCH received in step S502_0 to S502_M-1. While ACK/NACK is transmitted through a PUCCH basically, ACK/NACK is transmitted through a PUSCH when a PUSCH is transmitted at ACK/NACK transmission time. Various PUCCH formats shown in Table 4 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s):1 UL SF) and the relationship therebetween is determined by a DASI (Downlink Association Set Index).

Table 5 shows DASI (K: $\{k_0, k_1, \ldots, k_{M-1}\}$) defined in LTE(-A). Table 3 shows spacing between a UL subframe transmitting ACK/NACK and a DL subframe relating to the UL subframe. Specifically, when a PDCCH that indicates PDSCH transmission and/or SPS release is present in a subframe n-k ($k \in K$), the UE transmits ACK/NACK in a subframe n.

TABLE 5

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 5, 4, 8, 7, 11, 6 | — | — | — | — | — | — | — |
| 6 | — | — | 7 | 7 | 5 | — | — | 7 | 7 | — |

Specifically, a PUCCH resource index in an LTE system is determined as follows.

$$n^{(1)}_{PUCCH} = n_{CCE} + N^{(1)}_{PUCCH} \quad \text{[Equation 1]}$$

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift (CS), an orthogonal spreading code and a Physical Resource Block (PRB) for PUCCH formats 1a/1b are obtained from $n^{(1)}_{PUCCH}$.

A description will be given of TDD signal transmission timing in a single carrier (or cell) situation with reference to FIGS. 7 to 8.

Figure 7:
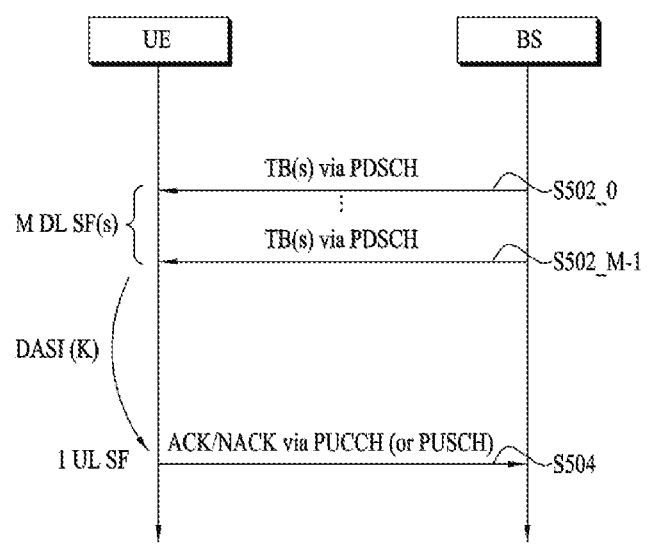
FIGS. 7-8 show a TDD Uplink Acknowledgement/Negative Acknowledgement (UL ACK/NACK) transmission timing in a single cell situation.
Figure 8:
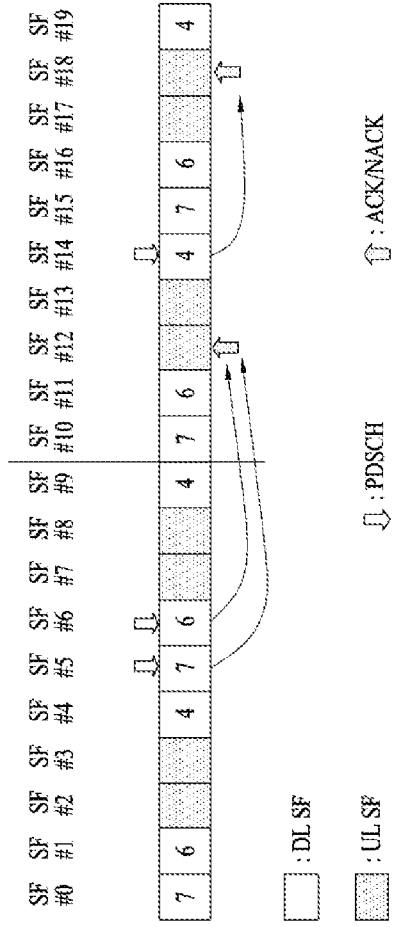

FIGS. 7-8 illustrate PDSCH-UL ACK/NACK timing. Here, UL ACK/NACK means ACK/NACK transmitted on uplink, as a response to DL data (e.g. PDSCH).

Referring to FIG. 7, a UE can receive one or more PDSCH signals in M DL subframes (SFs) (S502_0 to S502_M-1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M-1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK pay- FIG. 8 illustrates UL ACK/NACK transmission timing when UL-DL configuration #1 is configured. In the figure, SF #0 to #9 and SF #10 to #19 respectively correspond to radio frames, and numerals in blocks denote UL subframes relating to DL subframes. For example, ACK/NACK for a PDSCH of SF #5 is transmitted in SF #5+7 (=SF #12) and ACK/NACK for a PDSCH of SF #6 is transmitted in SF #6+6 (=SF #12). Accordingly, both ACKs/NACKs for DL signals of SF #5/#6 are transmitted in SF #12. Similarly, ACK/NACK for a PDSCH of SF #14 is transmitted in SF #14+4 (=SF #18).

When a UE transmits an ACK/NACK signal to a BS according to the TDD scheme, the following problems may occur.

If a UE misses at least one of PDCCH(s) transmitted from a BS during an interval of subframes, the UE does not even recognize whether a PDSCH corresponding to the missing PDCCH is transmitted to the UE, resulting in the occurrence of errors in ACK/NACK generation.

In order to solve the above-mentioned errors, the TDD system includes a downlink assignment index (DAI) in a PDCCH. DAI indicates an accumulative value (i.e., a counting value) of PDCCH(s) corresponding to PDSCH(s) and PDCCH(s) indicating DL SPS release up to a current subframe within DL subframe(s) n-k ($k \in K$). For example, if three DL subframes are mapped to one UL subframe, PDSCHs transmitted in 3 DL subframe intervals are sequentially indexed (i.e., sequentially counted), and the indexed result is loaded on a PDCCH that schedules a PDSCH. As a result, the UE can recognize whether a PDCCH has been normally received on the basis of DAI information contained in the PDCCH.

Figure 9:
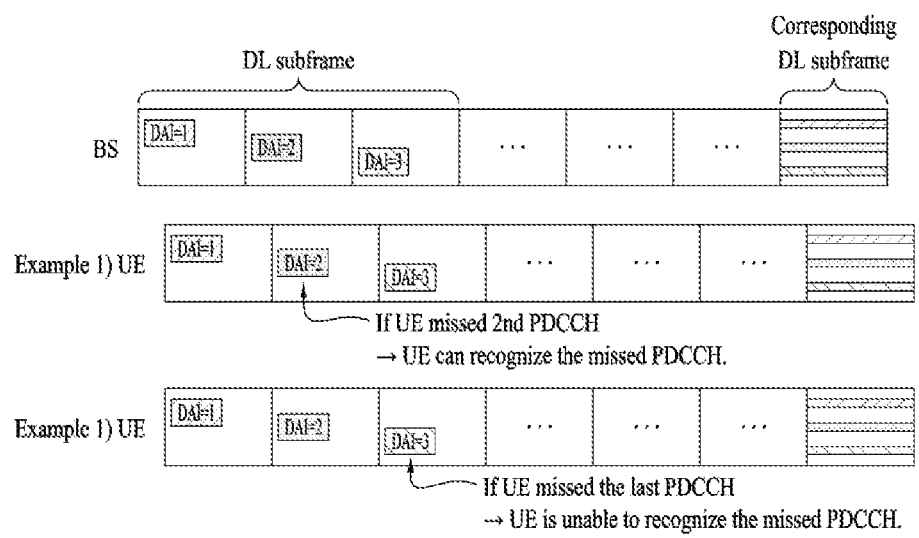
FIG. 9 illustrates an ACK/NACK transmission using Downlink Assignment Index (DAI).

FIG. 9 exemplarily shows ACK/NACK transmission using a DAI. For example, according to the TDD system shown in FIG. 9, one UL subframe is mapped to three DL subframes (i.e., 3 DL subframes:1 UL subframe). For convenience of description, it is assumed that the UE transmits an ACK/NACK signal using a PUCCH resource corresponding to the last detected PDCCH.

The first example of FIG. 9 shows that a UE missed a second PDCCH. Since a DAI value (DAI=3) of a third PDCCH is different from the number (i.e., 2) of received PDCCHs, the UE recognizes that the second PDCCH has been missed. In this case, the UE transmits ACK/NACK information using PUCCH resources corresponding to DAI=3, and an ACK/NACK response to the second PDCCH may be indicated by NACK (or NACK/DTX). In contrast, if the UE has missed the last PDCCH as shown in the second example, the UE is unable to recognize the absence (i.e., missing) of the last PDCCH because a DAI index of the last received PDCCH is identical to the number of received PDCCHs. Therefore, the UE recognizes that only two PDCCHs have been scheduled during the DL subframe. The UE transmits ACK/NACK information using PUCCH resources corresponding to DAI=2, such that the BS can recognize absence of a PDCCH including DAI=3.

Figure 10:
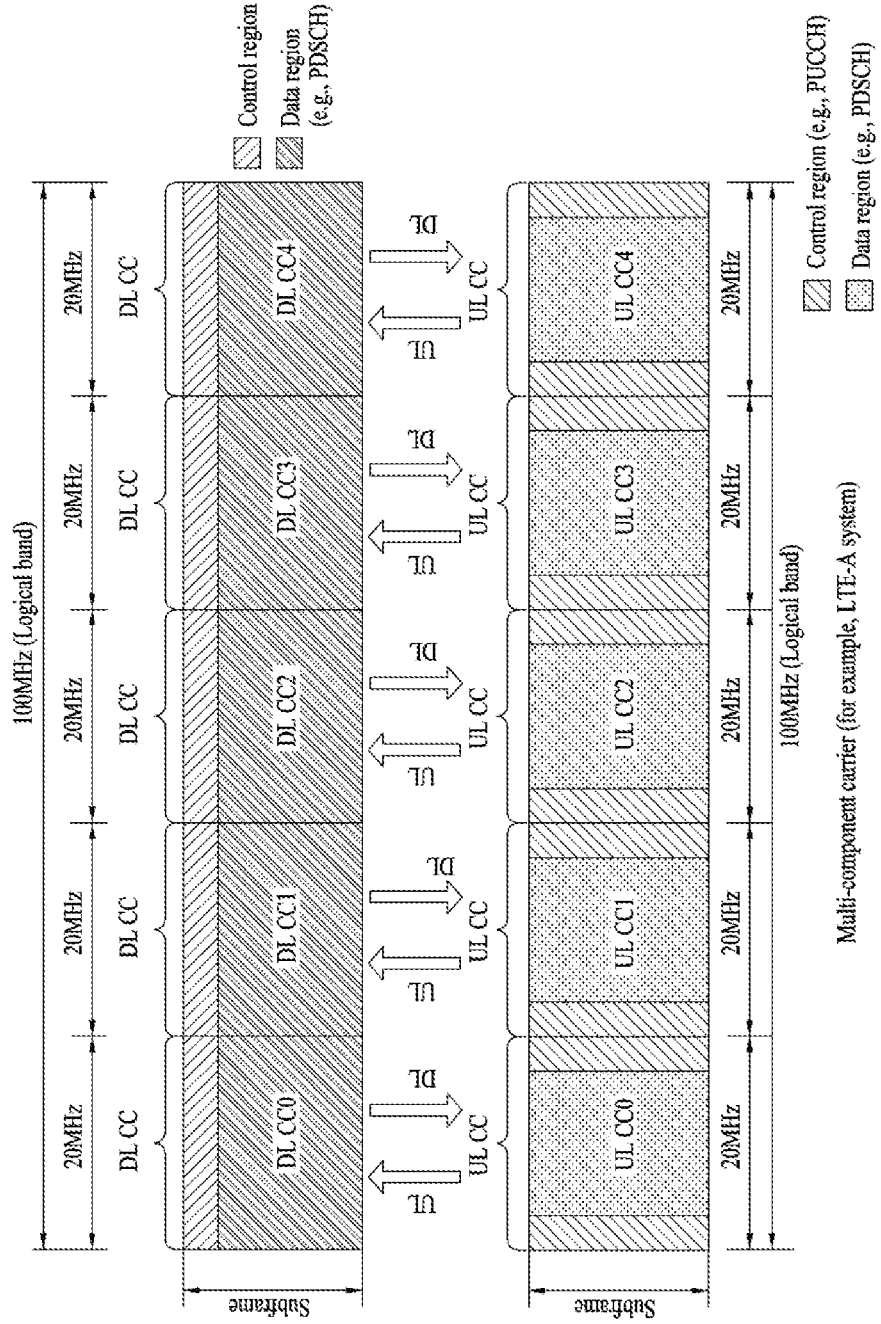
FIG. 10 exemplarily shows a carrier aggregation (CA) communication system.

FIG. 10 exemplarily shows a carrier aggregation (CA) communication system. The LTE-A system is designed to use a carrier aggregation or bandwidth aggregation technique using a plurality of UL/DL frequency blocks so as to use a wider frequency band. Each frequency block is transmitted using a component carrier (CC). The CC may be regarded as a carrier frequency (or center carrier, center frequency) for the frequency block.

Referring to FIG. 10, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

LTE-A uses the concept of a cell so as to manage radio resources. The cell is defined as a combination of DL resources and UL resources. Here, the UL resources are not an essential part. Accordingly, the cell can be configured with DL resources only, or DL resources and UL resources. When CA is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does not support CA while in an RRC_connected state, only one serving cell configured with a PCell exists. Conversely, for a UE that is in an RRC_Connected state and supports CA, one or more serving cells including a PCell and a SCell are provided. For CA, a network can configure one or more SCells for a UE that supports CA in addition to a PCell initially configured during a connection establishment procedure after an initial security activation procedure.

When cross-carrier scheduling (or cross-CC scheduling) is applied, a PDCCH for DL allocation can be transmitted through DL CC #0 and a PDSCH corresponding thereto can be transmitted through DL CC #2. For cross-CC scheduling, introduction of a Carrier Indicator Field (CIF) may be considered. The presence or absence of a CIF in a PDCCH can be set semi-statically and UE-specifically (or UE-group-specifically) according to higher layer signaling (e.g. RRC signaling). The base line of PDCCH transmission is summarized as follows.

CIF disabled: PDCCH on a DL CC allocates a PDSCH resource on the same DL CC or allocates a PUSCH resource on a linked UL CC.

CIF enabled: PDCCH on a DL CC can allocate a PDSCH or a PUSCH on a specific UL/DL CC from among a plurality of aggregated DL/UL CCs using the CIF.

When a CIF is present, a BS can allocate a PDCCH monitoring DL CC set in order to reduce BD complexity of a UE. The PDCCH monitoring DL CC set includes one or more DL CCs as part of aggregated DL CCs, and the UE detects/decodes a PDCCH only on DL CCs corresponding to the DL CC set. That is, if the BS schedules PDSCH/PUSCH for the UE, the PDCCH is transmitted only through a PDCCH monitoring DL CC set. The PDCCH monitoring DL CC set can be determined UE-specifically, UE-group-specifically or cell-specifically. The term "PDCCH monitoring DL CC" can be replaced by equivalent terms "monitoring carrier", "monitoring cell", etc. In addition, the term "aggregated CC" for a UE can be replaced by terms "serving CC", "serving carrier", "serving cell", etc.

Figure 11:
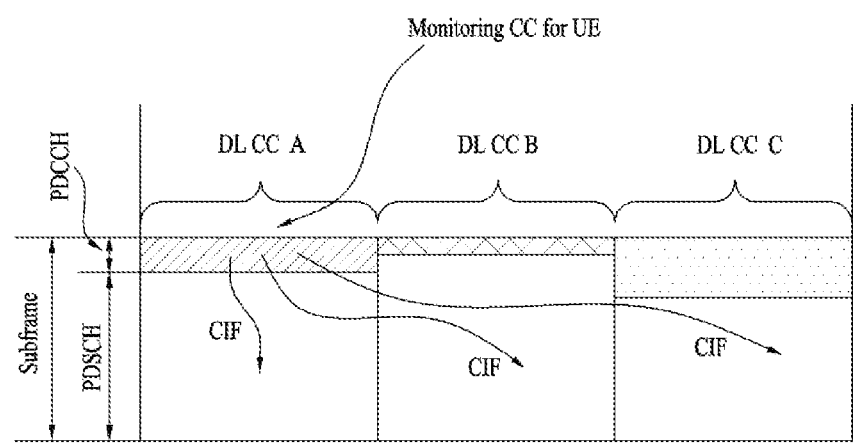
FIG. 11 exemplarily shows cross-carrier scheduling when a plurality of carriers are aggregated.

FIG. 11 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to a PDCCH monitoring DL CCs do not deliver PDCCHs.

LTE-A considers transmission of a plurality of ACK/NACK information/signals with respect to a plurality of PDSCHs, which are transmitted through a plurality of DL CCs, through a specific UL CC. To achieve this, it can be considered to joint-code (Reed-Muller code, Tail-biting convolutional code, etc.) a plurality of ACK/NACKs and transmit a plurality of ACK/NACK information/signals using PUCCH format 2, or a new PUCCH format (referred to as an Enhanced PUCCH (E-PUCCH) or PUCCH format M), distinguished from ACK/NACK transmission using PUCCH format 1a/1b in the legacy LTE system. The E-PUCCH format includes the following block-spreading based PUCCH format. After joint coding, ACK/NACK transmission using E-PUCCH format is exemplary, and E-PUCCH format may be used without being limited to UCI transmission. For example, E-PUCCH format may be used to transmit ACK/NACK, CSI (e.g. CQI, PMI, RI, PTI, etc.), SR, or two or more thereof. Accordingly, E-PUCCH format may be used to transmit joint-coded UCI codewords irrespective of type/number/size of UCI.

Figure 12:
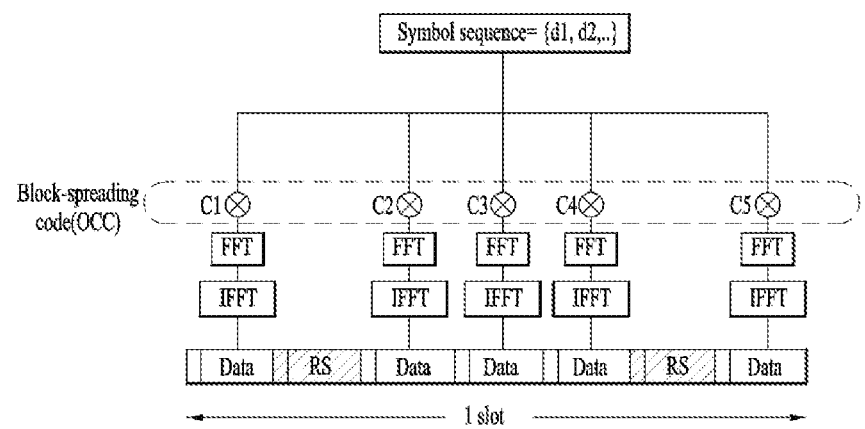
FIGS. 12~13 show an example of PUCCH format 3.

FIG. 12 illustrates a slot level structure of PUCCH format 3. PUCCH format 3 is used to transmit a plurality of ACK/NACK information/signals for a plurality of PDSCHs transmitted through a plurality of DL CCs. PUCCH format 3 may be used to transmit ACK/NACK, CSI (e.g., CQI, PMI, RI, PTI, etc.), SR, or two or more of these information items together.

Referring to FIG. 12, five SC-FDMA symbols (i.e., a UCI data part) are generated from one symbol sequence ({d1, d2, ... ) using OCC (C1 to C5) of length −5 (SF (Spreading Factor)=5). The symbol sequence {d1, d2, ... ) may refer to a modulation symbol sequence or a codeword bit sequence. When the symbol sequence ({d1, d2, ... ) refers to a codeword bit sequence, the block diagram of FIG. 12 further includes a modulation block. The RS symbol may be generated from a CAZAC sequence having a specific cyclic shift. The RS may be transmitted in a form in which a specific OCC is applied to (multiplied by) a plurality of RS symbols in the time domain. The block-spread UCI is transmitted to the network through an FFT (Fast Fourier Transform) process and an IFFT (Inverse Fast Fourier Transform) process on an SC-FDMA symbol basis.

Figure 13:
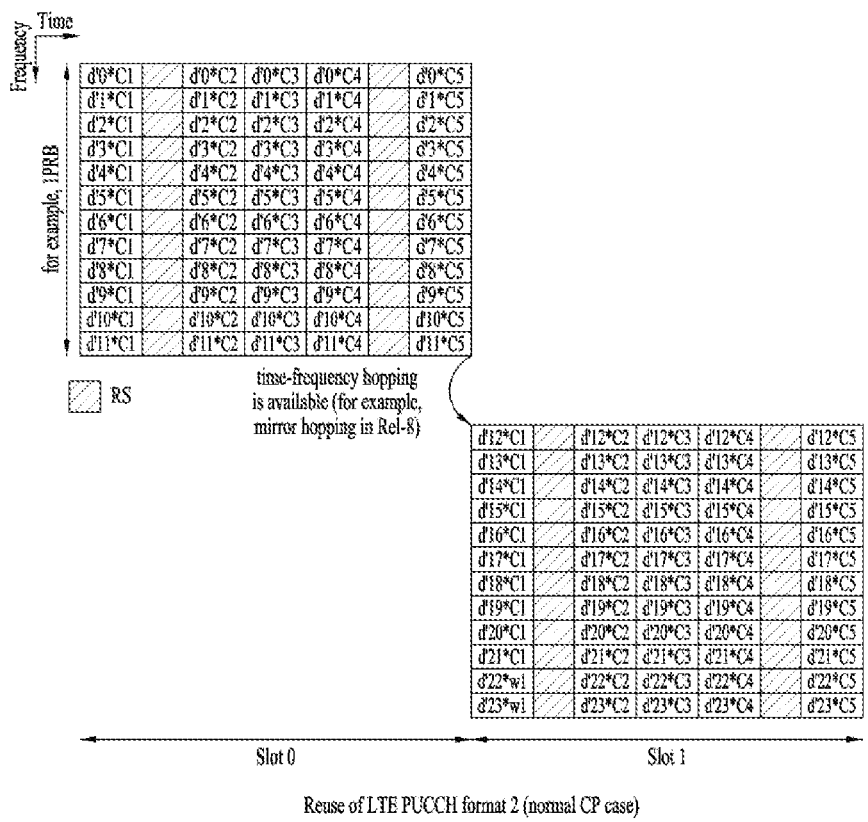

FIG. 13 illustrates a subframe-level structure of a PUCCH format 3. Referring to FIG. 13, in slot 0, symbol sequence {d'0, d'1, ... , d'11} is mapped to a subcarrier of one SC-FDMA symbol and mapped to 5 SC-FDMA symbols according to block spreading using OCC C1 to C5. Similarly, in slot 1, a symbol sequence {d'12, d'13, ... , d'23} is mapped to a subcarrier of one SC-FDMA symbol and mapped to 5 SC-FDMA symbols according to block-spreading using OCC C1 to C5. Here, symbol sequences {d'0, d'1, d'11} and {d'12, d'13, d'23} in slots 0 and 1 represent symbol sequence {d1, d2, ... }, shown in FIG. 12, which has been subjected to FFT or FFT/IFFT. The entire symbol sequence {d'0, d'1, ..., d'23} is generated by joint-coding one or more UCIs. The OCC may be changed based on slot and UCI data may be scrambled for each SC-FDMA symbol.

PUCCH format 3 resources may be explicitly allocated. In more detail, a PUCCH resource set is configured by a higher layer (e.g., RRC), and PUCCH resources to be actually used may be indicated by an ACK/NACK Resource Indicator (ARI) of the PDCCH.

Table 6 explicitly shows PUCCH resources for HARQ-ACK.

TABLE 6

| Value of HARQ-ACK resource for PUCCH (ARI) | $n_{PUCCH}$ |
|---|---|
| 00 | First PUCCH resource value configured by higher layer |
| 01 | Second PUCCH resource value configured by higher layer |

TABLE 6-continued

| Value of HARQ-ACK resource for PUCCH (ARI) | $n_{PUCCH}$ |
|---|---|
| 10 | Third PUCCH resource value configured by higher layer |
| 11 | Fourth PUCCH resource value configured by higher layer |

ARI represents an ACK/NACK resource indicator. In Table 6, the higher layer may include an RRC layer and an ARI value may be indicated by a PDCCH carrying a DL grant. For example, the ARI value may be designated using an SCell PDCCH and/or a Transmit Power Control (TPC) field of one or more PCell PDCCHs that do not correspond to a DAI initial value.

PUCCH format 4 is a PUCCH format that supports UCI transmission with a payload size larger than PUCCH format 3. The structure of PUCCH format 4 is basically the same as that of PUCCH format 3 except that block-spreading is not employed in PUCCH format 4. In addition, PUCCH format 4 resources may also be explicitly given. Specifically, a PUCCH resource set may be configured by a higher layer (e.g., RRC), and the PUCCH resource to be actually used may be indicated using the ARI value of the PDCCH.

In LTE-A, there are two methods of transmitting UCI and UL-SCH data at the same time. The first method is to transmit the PUCCH and the PUSCH at the same time, and the second method is to multiplex the UCI in the PUSCH as in legacy LTE. Whether the PUCCH and the PUSCH are allowed to be simultaneously transmitted may be set by a higher layer. When simultaneous transmission of PUCCH and PUSCH is enabled, the first method is used. When simultaneous transmission of PUCCH and PUSCH is disabled, the second method is used. The legacy LTE UEs cannot transmit PUCCH and PUSCH at the same time. Accordingly, when UCI (e.g., CQI/PMI, HARQ-ACK, RI, etc.) transmission is required in a subframe in which the PUSCH is transmitted, the method of multiplexing UCI in the PUSCH region is used. For example, when HARQ-ACK is to be transmitted in a subframe to which PUSCH transmission is allocated, the UE multiplexes the UL-SCH data and the HARQ-ACK before DFT-spreading, and transmits the control information and the data together on the PUSCH.

Figure 14:
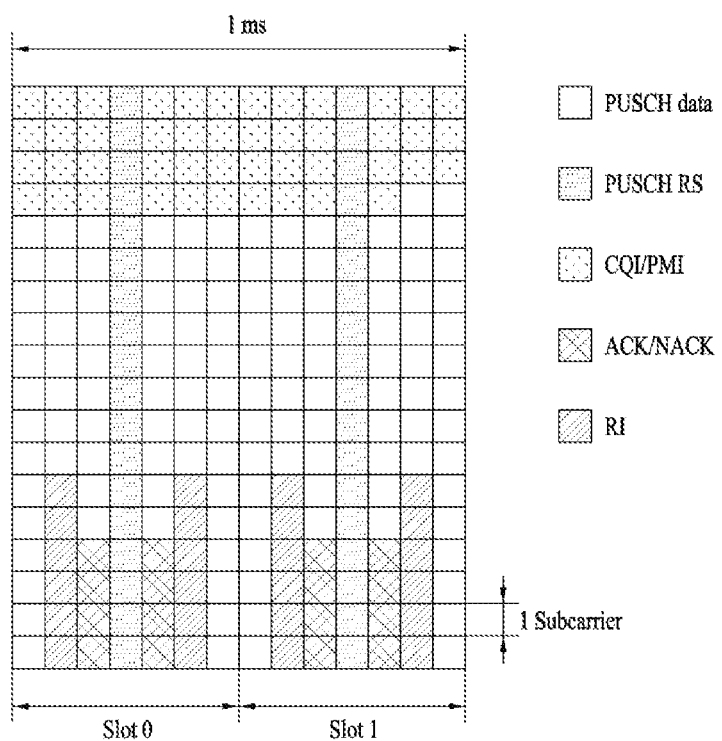
FIG. 14 is a conceptual diagram illustrating that control information and UL-SCH data are multiplexed on a Physical Uplink Shared CHannel (PUSCH).

FIG. 14 is a conceptual diagram illustrating that control information and UL-SCH data are multiplexed on a PUSCH. When transmitting control information in a subframe to which PUSCH transmission is allocated, the UE simultaneously multiplexes control information (UCI) and UL-SCH data prior to DFT spreading. The control information (UCI) includes at least one of CQI/PMI, HARQ ACK/NACK and RI. The number of REs used for transmission of each of CQI/PMI, ACK/NACK and RI is dependent upon Modulation and Coding Scheme (MCS) and offset values assigned for PUSCH transmission. The offset values allow different coding rates according to control information, and are semi-statically established by an higher layer (e.g., RRC) signal. UL-SCH data and control information are not mapped to the same RE. Control information is mapped to be contained in two slots of the subframe.

Referring to FIG. 14, CQI and/or PMI (CQI/PMI) resources are located at the beginning part of UL-SCH data resources, are sequentially mapped to all SC-FDMA symbols on one subcarrier, and are finally mapped in the next subcarrier. CQI/PMI is mapped from left to right within each subcarrier (i.e., in the direction of increasing SC-FDMA symbol index). PUSCH data (UL-SCH data) is rate-matched in consideration of the amount of CQI/PMI resources (i.e., the number of encoded symbols). The modulation order identical to that of UL-SCH data may be used in CQI/PMI. ACK/NACK is inserted into some resources of the SC-FDMA mapped to UL-SCH data through puncturing. ACK/NACK is located close to RS, fills the corresponding SC-FDMA symbol from bottom to top (i.e., in the direction of increasing subcarrier index) within the SC-FDMA symbol. In case of a normal CP, the SC-FDMA symbol for ACK/NACK is located at SC-FDMA symbols #2 and #5 in each slot as can be seen from FIG. 14. Irrespective of whether ACK/NACK is actually transmitted in a subframe, the coded RI is located next to the symbol for ACK/NACK.

In addition, control information (e.g., information about QPSK modulation) may be scheduled in a manner that the control information can be transmitted over PUSCH without UL-SCH data. Control information (CQI/PMI, RI and/or ACK/NACK) is multiplexed before DFT spreading so as to retain low CM (Cubic Metric) single-carrier characteristics. Multiplexing of ACK/NACK, RI and CQI/PMI is similar to that of FIG. 14. The SC-FDMA symbol for ACK/NACK is located next to the resources mapped to the CQI may be punctured. The number of REs for ACK/NACK and the number of REs for RI are dependent upon reference MCS (CQI/PMI MCS) and offset parameter. The reference MCS is calculated on the basis of CQI payload size and resource allocation. Channel coding and rate matching to implement control signaling having no UL-SCH data are identical to those of the other control signaling having UL-SCH data.

Figure 15:
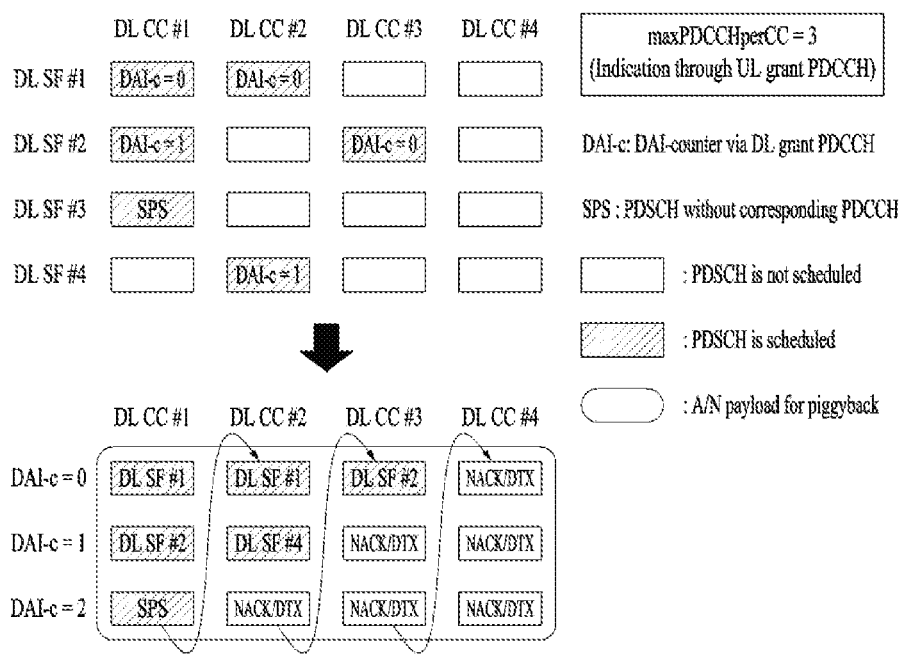
FIG. 15 shows an example of constructing an ACK/NACK payload in a conventional TDD CA.

FIG. 15 shows an example of constructing an ACK/NACK payload in a conventional TDD CA.

Referring to FIG. 15, the UE may adjust the total ACK/NACK payload size using the UL DAI value. UL DAI represents the DAI included in the UL grant (UG) DCI. That is, the UL DAI is included in the PDCCH for scheduling the PUSCH. Specifically, the UE may determine the size of an ACK/NACK payload (in other words, an ACK/NACK part) for each DL CC, considering the UL DAI value and the transmission mode and bundling of the corresponding CC. The UE may also determine the location of each ACK/NACK in the per-CC ACK/NACK payload using the DL DAI value(s) received at each DL CC. DL DAI represents the DAI included in the DL grant (DG) DCI. That is, the UL DAI is included in the PDCCH for scheduling the PDSCH or included in the PDCCH for instructing release of the DL SPS.

In more detail, it is assumed that the HARQ-ACK feedback bit for the c-th DL CC (or serving cell) is defined as $o_{c,0}^{ACK} o_{c,1}^{ACK}, \ldots, o_{c,O_c^{ACK}-1}^{ACK}$ (where c≥0). $O_c^{ACK}$ is the (i.e., size) of HARQ-ACK payload bits for the c-th DL CC. If a transmission mode for supporting single transmission block (TB) transmission is configured in the c-th DL CC or if the spatial bundling is applied to the c-th DL CC, $O_c^{ACK}$ may be identical to $B_c^{DL}$ as denoted by $O_c^{ACK}=B_c^{DL}$. In contrast, if a transmission mode for supporting transmission of multiple transmission blocks (e.g., two TBs) is configured in the c-th DL CC or if no spatial bundling is applied to the c-th DL CC, $O_c^{ACK}$ may be identical to $2B_c^{DL}$ as denoted by $O_c^{ACK}=2B_c^{DL}$. $B_c^{DL}$ is the number (i.e., maxPDCCHperCC) of DL subframes requiring ACK/NACK feedback in the c-th DL CC. If HARQ-ACK is transmitted through a PUSCH scheduled by a PDCCH, maxPDCCHperCC may be indicated by the value of a UL-DAI field. In accordance with this example, when deciding the 'maxPDCCHperCC' value, the BS may further consider a SPS PDSCH (that is, maxPDCHperCC=3). In contrast, if HARQ-ACK is transmitted through a PUCCH or a SPS PUSCH, maxPDCCHperCC is denoted by M (i.e., mxPDCCHperCC=M).

If a transmission mode for supporting transmission of a single transmission block is established in the c-th DL CC, or if spatial bundling is applied to the c-th DL CC, the position of each ACK/NACK in per-CC HARQ-ACK payload is given as $o_{c,DAI(k)-1}^{ACK}$. DAI(k) indicates a DL DAI value of the PDCCH detected at the DL subframe (n-k). In contrast, if a transmission mode for supporting transmission of multiple transmission blocks (e.g., two transmission blocks) is configured in the c-th DL CC and no spatial bundling is applied to the c-th DL CC, the position of each ACK/NACK in per-CC HARQ-ACK payload is denoted by $o_{c,2DAI(k)-1}^{ACK}$ and $o_{c,2DAI(k)-2}^{ACK}$. $o_{c,2DAI(k)-2}^{ACK}$ is a HARQ-ACK for the codeword 0, and $o_{c,2DAI(k)-1}^{ACK}$ is a HARQ-ACK for the codeword 1.

On the other hand, according to Option C, if SPS PDSCH is present, a HARQ-ACK position for SPS PDSCH may be located at $o_{c,O_c^{ACK}-1}^{ACK}$ in a HARQ-ACK payload for the corresponding CC. CC where the SPS PDSCH is present may be limited to a DL PCC.

Thereafter, the UE allows HARQ-ACK payload (i.e., HARQ-ACK part for each CC) for multiple CCs to be sequentially concatenated with each other according to the cell index. Preferably, the HARQ-ACK payload may be concatenated with each other in ascending numerical order of cell index. The entire HARQ-ACK payload configured by concatenation can be transmitted through a PUCCH or PUSCH upon completion of signal processing (e.g., channel coding, modulation, scrambling, etc.).

Embodiment: ACK/NACK (A/N) Transmission in Enhanced CA (eCA)

As described with reference to FIG. 15, in the existing CA system based on TDD, a plurality of HARQ-ACK feedbacks for DL data reception in a plurality of cells may be transmitted through one UL SF. In addition, the HARQ-ACK feedback corresponding to each cell may include a plurality of HARQ-ACKs (A/N) for DL data reception in a specific DL SF set (hereinafter referred to as a bundling window) in a corresponding cell. In addition, in DL grant (DG) DCI for scheduling each cell, a counter value indicating the scheduling order of the corresponding DL data within the bundling window of the corresponding cell may be transmitted through DAI (i.e., DL DAI), and a specific value selected from the base station may also be transmitted in the UL grant (UG) DCI through DAI (i.e., UL DAI). Accordingly, the UE may arrange A/N bits in order of the DL DAI values when the A/N payloads (per cell) are configured on the PUCCH/PUSCH. In particular, for A/N transmission on the PUSCH, the A/N feedback size may be reduced by constructing a payload only for DL DAI values below UL DAI (for each cell considering the UL DAI as the maximum value of DL DAI).

In a next-generation system, CA for a larger number of cells (e.g., 32 cells) is considered. In this case, the A/N feedback size for one UL SF may greatly increase in proportion to the number of cells subject to CA. DL scheduling may not be performed for all cells subject to CA in each SF even if the UE has CA set for many cells. In other words, when there is not much DL traffic, DL scheduling may be performed only for a specific part of the cells subject to CA. Therefore, it may be effective to reduce the total A/N feedback size by omitting configuration/transmission for the A/N corresponding to the unscheduled cells as much as possible in terms of A/N feedback transmission performance and UCI transmission resource overhead.

Hereinafter, a method for efficiently transmitting uplink control information, preferably ACK/NACK (i.e., HARQ-ACK), when a plurality of cells is aggregated for one UE.

For simplicity, it is assumed that, when a cell is set to the non-MIMO mode, at most one transport block (TB) (equivalent to a codeword) can be transmitted in subframe k of a corresponding cell. If the cell is set to the MIMO mode, it is assumed that a maximum of m (e.g., two) transport blocks (or codewords) can be transmitted in SF #k of the corresponding cell. Whether or not the cell is set to the MIMO mode may be identified using the transmission mode set by a higher layer. The number of ACK/NACKs (i.e., ACK/NACK bits, HARQ-ARQ bits) for the corresponding cell is assumed to be 1 (non-MIMO) or m (MIMO) regardless of the number of actually transmitted transport blocks (or codewords).

First, terms used in this specification are summarized below.

HARQ-ACK: Represents a reception response result to DL transmission (e.g., a PDSCH or a DL SPS release PDCCH), namely, ACK/NACK/DTX response (simply, ACK/NACK response). The ACK/NACK/DTX response refers to ACK, NACK, DTX or NACK/DTX. HARQ-ACK for a specific cell or the HARQ-ACK of a specific cell represents an ACK/NACK response to a DL signal (e.g., PDSCH) associated with (e.g., scheduled for) the cell. The PDSCH may be replaced by a TB or codeword. HARQ-ACK is fed back for (i) an SPS PDSCH, (ii) a PDSCH (hereinafter, normal PDSCH, non-SPS PDSCH) scheduled by the PDCCH (DG DCI), and (iii) a DL SPS release PDCCH (DG DCI). The SPS PDSCH does not accompany a corresponding PDCCH (DG DCI).

DL SPS release PDCCH: Represents a PDCCH indicating DL SPS release.

SPS PDSCH: Represents a PDSCH transmitted on DL by using a resource semi-statically configured by SPS. The SPS PDSCH has no corresponding DL grant PDCCH (DG DCI). In this specification, SPS PDSCH is used interchangeably with PDSCH without (w/o) PDCCH and SPS-based PDSCH.

SPS PUSCH: Represents a PUSCH transmitted on UL by using a resource semi-statically configured by SPS. The SPS PUSCH has no corresponding UL grant PDCCH (UG DCI). In this specification, SPS PUSCH is used interchangeably with PUSCH w/o PDCCH.

ARI (ACK/NACK Resource Indicator): Used to indicate a PUCCH resource.

In one example, the ARI may be used to indicate a resource variant value (e.g., offset) for a specific PUCCH resource (group) (configured by a higher layer). As another example, an ARI may be used to signal a specific PUCCH resource (group) index within a set of PUCCH resources (groups) (configured by a higher layer). The ARI may be included in the TPC (Transmit Power Control) field of the PDCCH corresponding to the PDSCH on the SCell. PUCCH power control is performed through the TPC field in the PDCCH (i.e., the PDCCH corresponding to the PDSCH on the PCC) for scheduling the PCell. In addition, the ARI may be included in the TPC field of the remaining PDCCHs except for the PDCCH for scheduling a specific cell (e.g., PCell) while having an initial value of a DAI (Downlink Assignment Index). ARI is used interchangeably with HARQ-ACK resource indication value.

DAI (Downlink Assignment Index): Included in the DCI transmitted through the PDCCH. The DAI may indicate an order value or a counter value of the PDCCH. The DAI is used for TDD operation in legacy LTE/LTE-A. For simplicity, the DAI of the DL grant PDCCH is referred to as DL DAI and is referred to as the UL DAI of the DAI in the UG PDCCH.

t-DAI: Represents DAI for signaling DL scheduling information in the time domain (i.e., SF domain) within the bundling window for each cell. This corresponds to the existing DL DAI (see DAI-c in FIG. 15). In the present invention, the t-DAI may be modified to signal information different from the conventional one.

(A/N) bundling window: The UE transmits HARQ-ACK feedback for DL data reception in the bundling window through the UL SF. When HARQ-ACK feedback is transmitted in SF #n, the bundling window is defined as SF #n-k. K=4 in FDD, and k in TDD is defined by DASI(K: {$k_0, k_1, \ldots k_{M-1}$}) in Table 5. The bundling window may be defined cell by cell.

PDCCH (DG DCI) for scheduling cell #A, cell #A scheduling PDCCH (DG DCI): Represents PDCCH (DG DCI) for scheduling the PDSCH on cell #A. That is, this represents PDCCH (DG DCI) corresponding to the PDSCH on CC #A, or a DG SPS release PDCCH (DG DCI) transmitted on CC #A.

Scheduling for cell #A, cell #A scheduling: Represents PDSCH or DG SPS release PDCCH transmission on cell #A. Alternatively, it may refer to an operation or process related to transmitting a PDSCH or DG SPS release PDCCH on cell #A. For example, it may mean transmitting a PDCCH for scheduling a PDSCH in consideration of PDSCH transmission on cell #A.

CS S-based scheduling: Refers to transmission of (i) PDCCH corresponding to PDSCH or (ii) DG SPS release PDCCH, in the CSS. The CS S-based PDSCH refers to a PDSCH scheduled by the PDCCH transmitted in the CSS.

CSS restriction: Indicates that the (maximum) number of CSS-based scheduling that can be performed within the bundling window is limited to a certain value (e.g., 1) or less.

SPS-based scheduling: Depending on context, may mean DG SPS release PDCCH transmission, SPS PDSCH transmission or SPS PUSCH transmission.

LCell and UCell: LCell refers to a cell operating in a licensed band and UCell refers to a cell operating in an unlicensed band. In the UCell, communication is performed based on carrier sensing.

Hereinafter, a method for efficiently performing A/N feedback based on DAI signaling in the DG/UL grant DCI in a CA situation (e.g., reduction of an A/N feedback size) is proposed. Specifically, a DAI signaling scheme (through DG/UL grant DCI) and a method of constructing A/N payload (on PUCCH/PUSCH) based on the DAI signaling scheme are proposed. In the present invention, TDD (or FDD) may include a case where the PCell or a cell performing A/N transmission operates in TDD (or FDD), and DG SF may include an S SF configured in TDD.

First, DAI (hereinafter, c-DAI) that signals DG scheduling information at a frequency domain (i.e., CC (cell) domain) in the same DG SF (in addition to t-DAI) may be considered.

(1) c-DAI Signaling Method Through DG/UL Grant DCI

The c-DAI (hereinafter, DL c-DAI) signaled through DL grant (DG) DCI for scheduling each DL SF may indicate: 1) a counter value (hereinafter referred to as count-DAI) indicating the scheduling order of a cell scheduled by the DG DCI among all cells with respect to an arbitrary or specific order (e.g., cell index order) in the corresponding DL SF, or 2) the CG (hereinafter, point-DAI) to which all cells scheduled through the DL SF (or bundling window) belong when a plurality of cell groups (i.e., CGs) is preconfigured for all cells. Each CG may include all or some cells, and a specific cell may be redundantly configured in multiple CGs.

In TDD, c-DAI may be signaled for each DL SF. Characteristically, in the case of count-DAI, considering inconsistency between the UE and the base station on the A/N allocation on the payload due to complexity in the A/N payload configuration and the DL grant DCI missing, the c-DAI value initially assigned to a specific cell (within the bundling window) may be signaled in a manner that the c-DAI value is assigned only to the corresponding cell. More specifically, for the c-DAI value assigned to a specific cell 1) if there is a c-DAI value pre-assigned to the corresponding cell through the previous DL SF, it may be assigned as it is, and 2) if not, a specific one (e.g., the least/the lowest value) among c-DAI values which are not pre-assigned to all cells.

FIG. 16 illustrates a count-DAI allocation method according to this embodiment. For example, assuming that cells 1, 2, 3 and 4 are configured in CA and c-DAI=1 and c-DAI=2 are assigned to cell 1 and cell 3 scheduled through SF #1, respectively, c-DAI=1 and c-DAI=3 may be assigned to cell 1 and cell 2 scheduled through SF #2, respectively. With count-DAI, t-DAI may be additionally transmitted. t-DAI indicates a scheduling order value on the SF axis in each cell.

In addition, in the TDD situation, considering inconsistency between the UE and the base station on the A/N allocation on the payload due to complexity of A/N payload configuration, DL grant DCI missing, and the like, point-DAI may be signaled in a manner of indicating a CG including all pre-scheduled cells (within the bundling window).

FIG. 17 illustrates a point-DAI allocation method according to this embodiment. For example, suppose that cells 1, 2, 3, and 4 are configured in CA and CGs 1, 2, and 3 are configured with cells 1/2, cells 1/2/3, and cells 1/2/3/4, respectively. When cells 1 and 2 are scheduled through SF #1, c-DAI in the DL grant DCI for scheduling SF #1 may be indicated as CG 1. When cell 4 is scheduled through SF #2, c-DAI may be indicated as CG 3. When cells 1 and 3 are scheduled through SF #3, c-DAI may be indicated as CG 3. t-DAI may be further transmitted along with point-DAI. t-DAI represents a scheduling order value on the SF axis in each cell.

The count-DAI may signal a counter value in units of CG indicating the scheduling order of a CG among all CGs when all the cells are (divided and) configured/set in a plurality of CGs. In this case, each CG may be constituted by only a part of cells, and each cell may be configured in only one CG. This method may be useful in that, when the counter-DAI is configured by only a limited number of bits (e.g., 2 bits) (e.g., a plurality of different counter values corresponds to the same counter-DAI bit combination by the modulo operation or the like), the UE successively fails to detect a plurality of (e.g., 4) DL grant DCIS and misinterprets the counter value in a specific DL grant DCI as another counter value corresponding to the same counter-DAI bit combination. For example, assuming that count-DAI represents the counter value in units of cell and counter-DAI is 2-bit counter-DAI, counter-DAI 2 bits=00, 01, 10 and 11 may correspond to counter=1/5, 2/6, 3/7, and 4/8, respectively. In this case, when the UE successively fails to detect four DL grant DCIS, the counter=6 may be misrecognized as counter=2 corresponding to the same bit 01.

FIG. 18 illustrates a count-DAI allocation method when count-DAI indicates a counter value in units of CG. For example, suppose that in FDD, CGs 1, 2, and 3 are configured with cells 1/2, cells 3/4, and cell 5, respectively. In this case, when cells 1, 3 and 4 are scheduled, the c-DAI values in the DG DCI corresponding to each cell are signaled as 1, 2 and 2, respectively. When cells 3, 4 and 5 are scheduled, the c-DAI values may be signaled as 1, 1, and 2, respectively.

When the count-DAI in units of CG (hereinafter referred to as CG-unit c-DAI) is applied, A/N arrangement (on PUCCH/PUSCH) for each cell in the CG corresponding to the same c-DAI may conform to the order of cell indexes. The c-DAI allocation rule in TDD may be applied to the count-DAI in units of CG as well. In addition, the count-DAI in units of CG may be applied even when the (scheduling) counter value is signaled using the CC first scheme by combining the CC (i.e., cell) domain with the SF domain in the TDD situation. For example, in the same way as in FIG. 18, three CG configurations may be considered, and a bundling window configured by three SFs may be assumed. In this case, when cells {1, 3, 4} are scheduled through SF #1, cells {1, 3, 4, 5} are scheduled through SF #2, and cells {1, 2} are scheduled through SF #3, the c-DAI values per cell in each SF may be signaled as {1, 2, 2} for SF #1, {3, 4, 4, 5} for SF #2, and {6, 6} for SF #3. A CG-unit c-DAI may be applied to a CA situation that includes a UCell, or a CA situation that includes more than a certain number of UCells. As another method, it is possible to increase the number of c-DAI configuration bits in the CA situation including (more than a certain number of) UCcells over other CA siguation. In this case, c-DAI can be applied on a cell-by-cell basis without applying the CG-unit c-DAI.

Counter-DAI signaling may be configured differently for each cell group (CG) having the same maximum number of transmittable TBs, Nt. For example, the counter value of the scheduled cell may be signaled through the counter-DAI in the DG DCI corresponding to the CG with Nt=2, while the counter value of the scheduled TB may be signaled through the counter-DAI in the DG DCI corresponding to the CG with Nt=1. Specifically, for a CG with Nt=2, 2-bit DAI {00, 01, 10, 11} is used to indicate the TB-level counter=2, 4, 6, 8, . . . . For a CG with Nt=1, 3-bit DAI {000, 001, 010, . . . , 111} may be used to indicate the counter=1, 2, 3, . . . , In this situation, the counter-DAI for the entire CA within one SF may count starting with the CG with Nt=2, and signal the counter value of the CG with Nt=1 later. In this case, when the last DAI of the CG with Nt=1 indicates an odd counter value in a specific SF in the TDD situation and the CG with Nt=2 is scheduled in the next SF, how to signal/apply the corresponding counter value may need to be predefined. Thus, the value of counter #2 of the CG with Nt=2 subsequent to the value (e.g., 3) of counter #1 of the CG with Nt=1 may be determined to be the minimum counter value (e.g., 6) greater than or equal to the counter #1 a value (e.g., 5), which is the sum of the value of counter #1 and Mt. Mt may be invariably set to 2, or may be determined to be the actually scheduled TB number (corresponding to counter #2). The bits corresponding to a counter value between the value of counter #1a and the value of counter #2 may be processed as a NACK. The above method may be equally applied to a case where the value of the entire counter-DAI is signaled in one SF by counting the CGs from a CG with Nt=1 and a CG with Nt=2 later.

In addition, t-DAI signaled for each cell in the TDD situation may signal a counter value in units of SGs (hereinafter referred to as SG-unit t-DAI) indicating the scheduling position of a scheduled SF (and an SG including the same) among all SGs when all the SFs in a bundling window are (divided and) configured/set in a plurality of SFs. As an example, it may be assumed that a bundling window configured in a specific cell consists of six SFs, and SGs 1, 2, and 3 are configured with SFs #1/2, SFs #3/4, and SFs #5/6, respectively. In this case, when SFs #1, 3, 4, and 5 are scheduled, the t-DAI values in the DG DCI corresponding to each SF may be signaled to indicate 1, 2, 2, and 3, respectively. SG-unit t-DAI can be applied only to UCell. When SFs #1, 5, and 6 are scheduled, the t-DAI values may be signaled to indicate 1, 2 and 2, respectively. The SG-unit t-DAI may be limitedly applied only to the UCell. In addition, in the case of the UCell, the number of t-DAI configuration bits may be increased over that in the case of the LCell (without applying the SG-unit t-DAI). Alternatively, in the case of the UCell, t-DAI signaling (field configuration) may be omitted, and the A/N bits corresponding to the UCell may be arranged/mapped in order of SF indexes/numbers on the entire A/N payload.

Scheduling for a specific cell (e.g., PCell) (or specific (e.g., SPS or CSS based) scheduling) can be excluded from c-DAI signaling. Accordingly, the c-DAI may be signaled only through the DCI that schedules the cells except the specific cell (or specific scheduling). Specifically, a cell-by-cell (scheduling) counter value may be allocated to the count-DAI considering only scheduling for cells other than the specific cell (or specific scheduling). In this case, the A/N feedback corresponding to the specific cell (or specific scheduling) may be consistently included in the A/N payload on the PUCCH/PUSCH regardless of the signaled count-DAI value (e.g., it may be disposed in/mapped to the MSB (Most Significant Bit) or a low bit index containing the same). In addition, the point-DAI may indicate a (scheduled) CG while CGs are composed of only the cells other than the specific cell. Even in this case, the A/N feedback corresponding to the specific cell may be consistently included in the A/N payload on the PUCCH/PUSCH regardless of the signaled point-DAI value.

As another method, the count-DAI indicating the scheduling order of a cell that is scheduled (by DG DCI) among all cells, namely, the scheduling order value, and/or the total-DAI value indicating the number of cells scheduled among all the cells in an SF in which the DG DCI transmission is performed, namely a scheduling total value (or information from which the value can be inferred), may be signaled through the corresponding DG DCI. In the present invention, the total-DAI may be replaced by/considered as information indicating the corresponding total scheduling number or last scheduling. In this case, the DAI configuration and UE operation may be performed depending on whether the given situation corresponds to FDD or TDD as follows.

1) FDD Case

A. Alt 1: When the DAI is signaled through the DG DCI for any cell

CSS or SPS-based scheduling does not accompany DAI signaling, and only USS-based scheduling of the PCell and SCell may be accompanied by DAI signaling. Here, the count-DAI may be determined/defined as an order value including (Opt 1) or excluding (Opt 2) CSS or SPS-based scheduling. The total-DAI can be determined/defined as the total value including the CSS or SPS-based scheduling. In this case, the A/N bits corresponding to the CSS or SPS-based scheduling may be arranged at/mapped to the MSB (i.e., A/N corresponding to counter-DAI=1) (in case of Opt 1) or the LSB (in case of Opt 2) on the entire A/N payload. In the present invention, count-DAI=1 may mean the count-DAI value corresponding to the initial scheduling (or signaled through the DG DCI corresponding to the initial scheduling) or the initial value of the count-DAI. The initial value of the count-DAI may be set to a different value (e.g., 0).

As another method, the count-DAI may be determined/defined as an order value including CSS-based scheduling and excluding SPS-based scheduling. In addition, the total-DAI may be determined/defined as a total value including CSS or SPS-based scheduling. In this case, the A/N bit corresponding to the CSS-based scheduling may be arranged at/mapped to the MSB (i.e., A/N corresponding to counter-DAI=1) on the entire A/N payload, the A/N bit corresponding to the SPS-based scheduling may be arranged at/mapped to the LSB on the entire A/N payload.

In a situation where only the PDSCH (e.g., CSS or SPS-based PDSCH) that does not accompany DAI (in particular, total-DAI) signaling is scheduled, PUSCH transmission may be scheduled/configured at the corresponding A/N transmission time. In this case, the UE may 1) transmit only the A/N (e.g., 1-bit A/N) corresponding to the reception of the PDSCH through a PUSCH piggyback, or 2) configure an A/N payload of a predetermined (minimum) size (e.g. the number of the A/N bits (e.g., 4 or 8) corresponding to up to the maximum counter value (e.g., 4)) and transmit the A/N payload through a PUSCH piggyback, or 3) configure an A/N payload of the maximum size (corresponding to, for example, the number of A/N bits corresponding to up to the last counter value on the assumption that all cells/SFs (i.e., pairs of a cell and an SF (cell-SF pairs)) are scheduled) and transmit the A/N payload through a PUSCH piggyback. In cases 2) and 3), the A/N (e.g., 1-bit A/N) corresponding to PDSCH reception may be arranged at/mapped to the MSB or LSB on the entire A/N payload. The aforementioned operations may be limitedly performed (while there is no total-DAI received through the DG DCI) (i) when no UG DCI transmission corresponding to the PUSCH is accompanied, or (ii) when the UL DAI (corresponding to the total-DAI) is not signaled through the UG DCI corresponding to the PUSCH.

When there is only total-DAI received through the DG DCI for A/N piggyback transmission on the PUSCH or there is only UL DAI (corresponding to the total-DAI) received through the UG DCI, the UE may configure an A/N payload based on one DAI (total-DAI or UL DAI) value. For A/N piggyback transmission through the PUSCH, there may be the total DAI received through the DG DCI and the UL DAI received through the UG DCI and the values thereof may be different from each other. In this case, the UE may 1) transmit an A/N on the PUSCH by configuring an A/N payload based on the UL DAI value, 2) transmit an A/N on the PUSCH by configuring an A/N payload based on the maximum value between the UL DAI and the total-DAI, 3) transmit an A/N on the PUCCH (omitting/discarding PUSCH transmission) by configuring an A/N payload based on the total-DAI value, or 4) transmit an A/N on the PUCCH (omitting/discarding PUSCH transmission) by configuring an A/N payload based on the maximum value between the UL DAI and the total-DAI.

As another method, piggyback transmission for the A/N may be limited to be performed only on the PUSCH having the same UL DAI value as the total-DAI. A PUSCH having a UL DAI value different from the total-DAI may be transmitted without A/N piggyback, or may be omitted/discarded. If there is no PUSCH having the same UL DAI value as the total-DAI, the UE may transmit an A/N on the PUCCH by configuring an A/N payload based on the total-DAI value with all transmissions omitted/discarded as in case 3).

Even in the case where only the PDSCH (e.g., CSS-based PDSCH corresponding to count-DAI=1) (or SPS-based PDSCH) that does not accompany total-DAI signaling and ARI signaling together is scheduled, and the UCI including a corresponding A/N is transmitted through PUCCH format 3 (PF3) or PUCCH format 4 (PF4) configured (semi-statically through higher layer signaling) for use in periodic CSI transmission, configuration of an A/N payload on the PUCCH and A/N bit arrangement/mapping may be performed in a manner similar to the method described above.

As another method, when UCI including an A/N is transmitted on a PUSCH or a PUCCH (e.g., a PUCCH configured for periodic CSI transmission), the A/N bits (e.g., 1 bit) corresponding to PDSCH scheduling (e.g., CSS or SPS-based PDSCH scheduling) that does not accompany total-DAI and/or ARI signaling may be transmitted within the A/N payload on the PUSCH or the entire UCI payload on the PUCCH in a manner that the A/N bits are always allocated to/configured at a specific position (e.g., LBS or MSB) on the A/N payload (regardless of actual scheduling).

B. Alt 2: When the DAI is Signaled Only Through the DG DCI for the SCell

Scheduling for the PCell may not accompany DAI signaling, but the DAI signaling may be accompanied only in scheduling for the SCell. In this case, the count-DAI may be determined/defined as an order value (Opt 1) including or (Opt 2) excluding PCell scheduling. The total-DAI may be determined/defined as the total sum including PCell scheduling. The A/N bits corresponding to the PCell scheduling may be arranged at/mapped to the MSB (i.e., considered as an A/N corresponding to counter-DAI=1) (in case of Opt 1) or LSB (in case of Opt 2) on the entire A/N payload.

2. TDD Case

A. Alt 1-1: When the DAI is Signaled Through the DG DCI for any Cell

SPS-based scheduling may not accompany DAI signaling, but CSS-based scheduling may accompany count-DAI signaling only (without total-DAI signaling). USS-based scheduling of the PCell and the SCell may accompany count-DAI signaling and total-DAI signaling. In this case, the count-DAI may be determined/defined as an order value excluding SPS-based scheduling, and the total-DAI may be determined/defined as the total value including CSS or SPS-based scheduling. Here, the A/N bits corresponding to SPS-based scheduling may be arranged at/mapped to the LSB on the entire A/N payload. In this case, a TPC command may be transmitted through the TPC field of the PCell scheduling DG DCI with count-DAI=1, and the ARI may be transmitted through the TPC field of the remaining DG DCI (i.e., DG DCI without count-DAI=1 or SCell scheduling DG DCI). Therefore, when only PCell scheduling and/or SPS-based scheduling with count-DAI=1 is received, the UE may transmit only the A/N corresponding to the scheduling using PUCCH format 1a/1b (with channel selection).

In the case of SPS-based scheduling, PUCCH format 1a/1b (i.e., PF1) resource candidate(s) for A/N transmission for the SPS PDSCH are preconfigured through higher layer (e.g., RRC) signaling and one of the resource candidates(s) is allocated as an A/N transmission PF1 resource corresponding to the SPS PDSCH through the TPC field in the PDCCH indicating DL SPS activation. According to operation of the present invention, ARI indicating one of a plurality of PF3 or PF4 resources may be signaled through a TPC field in a DG PDCCH that has a count-DAI value other than count-DAI=1 and schedules the PCell. If the PDCCH is a PDCCH indicating DL SPS activation, PF1 resources for SPS may also need to be indicated through the TPC field. In this case, the PF3/PF4 resource and the PF1 resources for the SPS may need to be indicated simultaneously by one TPC field, which may lower the freedom of resource selection for each of the PF3/PF4 resources and the PF1 resources for SPS.

In view of this, only the PF1 resources for SPS may be indicated through the TPC field in the PDCCH indicating DL SPS activation (without indicating other resources such as PF3/PF4 resources). That is, the TPC field in the PDCCH indicating DL SPS activation may be used only to indicate the PF1 resources for SPS regardless of the count-DAI value. Accordingly, even when only the PDCCH indicating DL SPS activation and/or PCell scheduling DG DCI having count-DAI=1 are received, only the A/N corresponding to the PDCCH/scheduling may be transmitted using PUCCH format 1a/1b (with channel selection). At this time, the A/N resources for the PDSCH corresponding to the DL SPS activating PDCCH 1) may be assigned PF1 resources implicitly linked to the corresponding PDCCH transmission resources (Equation 1), or 2) may be assigned PF1 resources for SPS indicated through the TPC field in the corresponding PDCCH. The proposed method may be equally applied to the existing t-DAI signaling-based TDD situation (by replacing count-DAI with t-DAI).

When only a PDSCH (e.g., CSS and/or SPS-based PDSCH) which does not accompany DAI (in particular, total-DAI) signaling is scheduled, PUSCH transmission may be scheduled/configured at the time of corresponding A/N transmission. In this case, the UE 1) may transmit only the A/N (e.g., a 1-bit A/N if one of the CSS and the SPS is scheduled, a 2-bit A/N if both the CSS and the SPS are scheduled, on the assumption of a CSS restriction) corresponding to reception of the PDSCH on the PUSCH, 2) configure an A/N payload of a predetermined (minimum) size (e.g. the number of A/N bits (e.g., 4 or 8) corresponding to up to the maximum counter value (e.g., 4)) and transmit the same on the PUSCH, or 3) configure an A/N payload of the maximum size (corresponding to, for example, the number of A/N bits corresponding to up to the last counter value on the assumption that all cells/SFs are scheduled) and transmit the same on the PUSCH. In cases 2) and 3), the A/N (e.g., 1-bit A/N or 2-bit A/N) corresponding to the PDSCH reception may be arranged at/mapped to the MSB or LSB on the entire A/N payload. The aforementioned operations may be limitedly performed (while there is no total-DAI received through the DG DCI) when no UG DCI transmission corresponding to the PUSCH is accompanied, or when the UL DAI (corresponding to the total-DAI) is not signaled through the UG DCI corresponding to the PUSCH.

There may be only total-DAI received through the DG DCI for A/N piggyback transmission on the PUSCH or there is only UL DAI (corresponding to the total-DAI) received through the UG DCI. In this case, the UE may configure an A/N payload based on one DAI (total-DAI or UL DAI) value. For A/N piggyback transmission through the PUSCH, there may be the total DAI received through the DG DCI and the UL DAI received through the UG DCI and the values thereof may be different from each other. In this case, the UE may 1) transmit an A/N on the PUSCH by configuring an A/N payload based on the UL DAI value, 2) transmit an A/N on the PUSCH by configuring an A/N payload based on the maximum value between the UL DAI and the total-DAI, 3) transmit an A/N on the PUCCH (omitting/discarding PUSCH transmission) by configuring an A/N payload based on the total-DAI value, or 4) transmit an A/N on the PUCCH (omitting/discarding PUSCH transmission) by configuring an A/N payload based on the maximum value between the UL DAI and the total-DAI. As another method, piggyback transmission for the A/N may be limited to be performed only on the PUSCH having the same UL DAI value as the total-DAI. In this case, a PUSCH having a UL DAI value different from the total-DAI may be transmitted without A/N piggyback, or may be omitted/discarded. If there is no PUSCH having the same UL DAI value as the total-DAI, the UE may transmit an A/N on the PUCCH by configuring an A/N payload based on the total-DAI value with all transmissions omitted/discarded as in case 3).

CS S-based scheduling may include count-DAI signaling through the corresponding DG DCI. In this situation, when only the CSS-based PDSCH is scheduled, the UE may Opt 1) configure only an A/N payload corresponding to the counter-DAI value and transmit the same on the PUSCH, or Opt 2) configure an A/N payload of a predetermined (minimum) size and transmit the same on the PUSCH, wherein an A/N for reception of the CSS-based PDSCH may be arranged at/mapped to the bits corresponding to the counter-DAI value on the payload. If there is additional SPS-based scheduling in this situation, the UE may 1) add 1 bit to the end (or start) of the payload configured based on Opt 1 and arrange/map the A/N corresponding to reception of the SPS-based PDSCH at/to the 1 bit, namely the LSB (or MSB) on the entire payload, or 2) arrange/map the A/N corresponding to reception of the SPS-based PDSCH at/to the LSB (or MSB) on the payload configured based on Opt 2, wherein, if the A/N corresponding to reception of the SPS-based PDSCH has already been arranged at/mapped to the LSB (or MSB), 1 bit may be added to the end (or start) of the payload and the A/N corresponding to reception of the SPS-based PDSCH may be arranged at/mapped to the 1 bit.

When only a PDSCH (e.g., CSS-based PDSCH corresponding to count-DAI>1) (and/or an SPS-based PDSCH) that accompanies ARI signaling indicating a PF3 resource or a PF4 resource without involving total-DAI signaling is scheduled, the UCI including the corresponding A/N may be transmitted through PF3 or PF4 indicated by the ARI. In this case, A/N payload configuration and A/N bit arrangement/mapping on the PUCCH may be performed in a manner similar to the above method (e.g., Opt 1 to 2). When only a PDSCH (e.g., CSS-based PDSCH corresponding to count-DAI=1) (and/or an SPS-based PDSCH) that does not accompany either total-DAI signaling or ARI signaling (e.g., CSS-based PDSCH corresponding to count-DAI=1) is scheduled, the UCI including the corresponding A/N may be transmitted through PF3 or PF4 configured for periodic CSI transmission (semi-statically through higher layer signaling). In this case, the A/N payload configuration and A/N bit arrangement/mapping on the PUCCH may be performed in a similar manner (e.g., Opt 1 to 2).

As another method, when the UCI including an A/N is transmitted on a PUSCH or a PUCCH (e.g., a PUCCH indicated by the ARI or a PUCCH configured for periodic CSI transmission), the A/N bits (e.g., 2 bits or 1 bit) corresponding to PDSCH scheduling (e.g., CSS or SPS-based PDSCH scheduling) that does not accompany total-DAI and/or ARI signaling may be transmitted within the A/N payload on the PUSCH or the entire UCI payload on the PUCCH in a manner that the A/N bits are always allocated to/configured at a specific position (e.g., LBS or MSB) on the A/N payload (regardless of actual scheduling). In addition, if the CSS restriction is not separately configured, the number of A/N bits consistently allocated to/configured at a specific position of the A/N payload (regardless of whether or not scheduling is actually performed) may be determined/set to be the M bits as M, the number of DL (or S) SFs in the bundling window.

B. Alt 1-2: When the DAI is Signaled Through the DG DCI for any Cell

SPS and CSS-based scheduling may accompany none of count-DAI signaling and total-DAI signaling, but count-DAI and total-DAI signaling may be accompanied only in US S-based scheduling of the PCell and the SCell. The t-DAI field in the CSS-based DG DCI may be set to a fixed value (e.g., 0). In USS-based scheduling, the count-DAI is determined/defined as an order value excluding SPS or CS S-based scheduling, and the total-DAI may be determined/defined as a total value including CSS or SPS-based scheduling. Here, the A/N bits corresponding to the SPS/CSS-based scheduling may be arranged at/mapped to the LSB in the entire A/N payload. In addition, the (maximum) number of CSS-based scheduling operations that may be performed within the bundling window may be limited to a certain value (e.g., 1) or less (CSS restriction). In this case, the TPC command may be transmitted through the TPC field of the PCell scheduling DG DCI with count-DAI=1 and the DG DCI transmitted through the CSS. The ARI may be transmitted through the TPC field of the remaining DG DCI (i.e., DG DCI not count-DAI=1 or SCell scheduling DG DCI). Therefore, when only PCell scheduling and/or SPS/CSS-based scheduling with count-DAI=1 is received, the UE may transmit only the A/N corresponding to the scheduling using PUCCH format 1a/1b (with channel selection).

C. Alt 2: DAI is Signaled Only Through the DG DCI for the SCell

PCell scheduling may accompany existing t-DAI signaling without signaling for the count-DAI/total-DAI, and the count-DAI and total-DAI signaling may be accompanied only in SCell scheduling. In this case, the count-DAI may be determined/defined as an order value excluding PCell scheduling, and the total-DAI may be determined/defined as the total value excluding PCell scheduling. Separately, the (maximum) number of A/N bits corresponding to the entire PCell may be consistently reserved in the A/N payload. The A/N bits corresponding to PCell scheduling may be arranged at/mapped to the MSB or the LSB in the entire A/N payload. As another method, the total-DAI may be determined/defined as the total value including PCell scheduling (and the count-DAI may be determined/defined as an order value excluding PCell scheduling). In this case, for the A/N payload configuration, Opt 1) an A/N corresponding to the t-DAI may be mapped to the MSB side (in order of t-DAI values) and an A/N corresponding to the count-DAI may be mapped to the LSB side (in reverse order of the count-DAI values), or conversely, Opt 2) the A/N corresponding to the count-DAI may be mapped to the MSB side (in order of the count-DAI values), and the A/N corresponding to the t-DAI may be mapped to the LSB side (in reverse order of the t-DAI values). For example, in the case of Opt 1, A/N mapping may be performed on the A/N payload in the form of {t-DAI=1, t-DAI=2, t-DAI=3, . . . , count-DAI=3, count-DAI=2, count-DAI=1}. In the case of Opt 2, A/N mapping may be performed on the A/N payload in the form of {count-DAI=1, count-DAI=2, count-DAI=3, . . . , t-DAI=3, t-DAI=2, t-DAI=1}.

In this case, the TPC command may be transmitted through the TPC field of the PCell scheduling DG DCI with t-DAI=1, and the ARI may be transmitted through the TPC field of the remaining DG DCI (i.e., DG DCI without t-DAI=1 or SCell scheduling DG DCI). Accordingly, upon receiving only PCell scheduling and/or SPS-based scheduling with t-DAI=1, the UE may transmit only the A/N corresponding to the scheduling using PUCCH format 1a/1b (with channel selection). Here, PUCCH format (or resource) A indicated by the ARI signaled through the (PCell scheduling) DG DCI corresponding to t-DAI>1 may be set to be the same as or different from PUCCH format (or resource) B indicated by the ARI signaled through the (SCell scheduling) DG DCI corresponding to the count-DAI. In the case where two ARIs are set to indicate different PUCCH formats (or resources), PUCCH format (or resource) B may be selected to perform A/N transmission when DG DCI corresponding to the count-DAI is received, and PUCCH format (or resource) A may be selected to perform A/N transmission when only DG DCI corresponding to the t-DAI is received.

As another method, in the case of DG DCI transmitted through the CSS, the total-DAI may be signaled through the TPC field in the DCI. In this case, the TPC command for PUCCH power control may not be signaled through the CSS-based DG DCI. Alternatively, in FDD, the count-DAI may be signaled through the TPC field in the CSS-based DG DCI. In TDD, the total-DAI may be signaled through the TPC field in the CSS-based DG DCI (in TDD, this may be the case of all or specific CS S-based DG DCIS (corresponding to, for example, count-DAI=1). In this case, the TPC command for the PUCCH may not be signaled through the CSS-based DG DCI.

As another method, in FDD and TDD, when the count-DAI and the total-DAI are defined/configured to signal the scheduling order or the total number of a PDSCH accompanying a corresponding DG DCI transmission or a PDCCH transmitted for a specific purpose (e.g., indicating a DL SPS release), the UE may configure the entire A/N payload (e.g., N bits) with A/N bits (e.g., N bits) corresponding to the total-DAI. If there are multiple DG DCIS, the DG DCIS in the same SF have the same value of total-DAI. If SPS-based PDSCH transmission is to be performed, the UE may configure the entire A/N payload (e.g., N+1 bits) by adding A/N bit (e.g., 1 bit) for the SPS-based PDSCH to A/N bits (e.g., N bits) corresponding to the total-DAI. The entire A/N payload may be transmitted on the PUCCH or PUSCH. The A/N bits corresponding to the SPS-based PDSCH may be arranged at/mapped to the MSB or the LSB on the entire A/N payload.

Meanwhile, in the TDD situation, the counter-DAI may be replaced by/used as signaling indicating a (scheduling) counter value in the CC first scheme in the CC and SF domains (i.e., the CC/SF domain or the cell/SF domain) by combining the CC (i.e., cell) domain with the SF domain. For example, the counter-DAI may indicate the scheduling order of a cell, that is scheduled (by the DG DCI), among all cells, i.e., the scheduling order value in units of cell/SF (pair of cell and SF). In the CC first scheme, the scheduling order in units of cell/SF is calculated in order of increasing SF index after increasing the CC (i.e., cell) index in the bundling window. In addition, the total-DAI may be replaced with/considered as signaling indicating the scheduling total value based on the counter-DAI signaling. Specifically, the total-DAI may be defined/signaled to indicate the cumulative scheduling total value (e.g., the sum of the cells scheduled by the DG DCI) along the DL SF. For example, when it is assumed that three, two, and four cells are scheduled through DL SFs #1, #2 and #3, respectively, in a situation where the A/Ns for DL SFs #1, 2 and 3 are transmitted through one UL SF, the total-DAI may be defined/signaled to indicate total-DAI=3 for DL SF #1, total-DAI=5 for DL SF #2, and total-DAI=9 for DL SF #3.

FIG. 19 illustrates a count-/total-DAI allocation method according to this embodiment. It is assumed that cells 1, 2, 3, and 4 are subjected to CA for the UE, and that the bundling window is composed of SF #1 to SF #3. Referring to FIG. 19, cell/SF resources of (Cell 1, SF #1), (Cell 2, SF #1), (Cell 4, SF #2), (Cell 1, SF #3), and (Cell 3, SF #3) are scheduled, and the other cell/SF resources are not scheduled. Here, scheduling means that DL transmission for which HARQ-ACK feedback is required is performed in the corresponding cell/SF resource, and DL transmission for which HARQ-ACK feedback is required includes a PDSCH and an SPS release PDCCH. For example, there may be PDSCH transmission in (Cell 2, SF #1). In this case, the PDCCH for scheduling the PDSCH may be transmitted in (Cell 2, SF #1) (self-scheduling) or transmitted in (Cell X, SF #1) (cross-carrier scheduling) according to the scheduling scheme. Cell X denotes a scheduling cell of cell 1. The SPS PDSCH does not accompany count-DAI/total-DAI, and the figure illustrates only a case where the PDSCH scheduled by the PDCCH (DG DCI) (and SPS release PDCCH) is scheduled. In this embodiment, the count-DAI indicates the (scheduling) counter value in the cell first scheme and therefore indicates 1 to 5 in order of (Cell 1, SF #1)=>(Cell 2, SF #1)=>(Cell 4, SF #2)=>(Cell 1, SF #3)=>(Cell 3, SF #3). In addition, the total-DAI indicates the accumulative scheduling total value along the DL SF. Therefore, the total-DAI indicates total-DAI=2 for SF #1, total-DAI=3 for SF #2, and total-DAI=5 for DL SF #3, respectively. In the same SF, the total-DAIS have the same value. The count-/total-DAI is used for the HARQ-ACK transmission procedures (HARQ-ACK payload configuration, HARQ-ACK bit positioning, DTX detection, etc.).

If a method of signaling the total-DAI value other than the above-described method is considered, a problem may arise.

For example, if the total-DAI is defined to individually indicate only the scheduling total value in each DL SF (total-DAI=2 for SF #1 and total-DAI=2 for SF #=1 and total-DAI=2 for DL SF #3 in the example above), there may be a problem in matching the A/N payload between the base station and the UE when all the DG DCIS in a specific DL SF are missing.

In another example, if the total-DAI is defined to indicate the total scheduling value in all DL SFs (total-DAI=5 for SF #1, total-DAI=5, and total-DAI=5 for DL SF #3), the burden on the BS scheduler, which must predict scheduling at a future time, may be increased.

In the above example, the total-DAI may be configured to indicate only some representative values among all possible scheduling sum (i.e., total) values. In this case, in a situation where the total-DAI consists of only a limited number of bits (e.g., 2 bits) (e.g., a plurality of different total values corresponds to the same total-DAI bit combination by the modulo operation or the like), if the UE successively fails to detect a plurality of DG DCIS (e.g., 4 DG DCIS) and thus misrecognizes the total value in a specific DG DCI as another total value corresponding to the same total-DAI bit combination (e.g., when total-DAI 2-bits=00, 01, 10 and 11 correspond to total=1/5, 2/6, 3/7 and 0/4/8, respectively, total=7 is misrecongized as total=3 corresponding to the same bit 10). For example, when total-DAI 2-bits=00, 01, 10, and 11 are set to correspond to total=2/10, 4/12, 6/14, and 0/8/16, 8, respectively (i.e., multiple of 2 through application of modulo-8), the base station may indicate a total-DAI corresponding to the minimum total value among the total values that are greater than or equal to the total value scheduled by the base station, and the UE may assume this operation. In another method, when the total number of cells is assumed to be N, total-DAI 2-bits=00, 01, 10, and 11 may be set to correspond to total=N1, N2, N3, N (N1>N2>N3>N) (without separate modulo operation) (hereinafter, quantized total-DAI). The quantized total-DAI may be applied to CA that includes a UCell or CA that includes more than a certain number of UCells. In another method, in the situation of CA including (more than a certain number of) UCells, the number of total-DAI configuration bits may be increased (without applying quantized total-DAI) over the other CA situation.

The c-DAI (i.e., UL c-DAI) signaled through the UG DCI may indicate 1) the maximum value of the DL count-DAI or the (maximum) total-DAI value as in conventional cases if the DL c-DAI is count-DAI (alternatively, the UE considers the received UL c-DAI value as the maximum value of the DL count-DAI or the total-DAI (maximum) value) (hereinafter, UL count-DAI), or 2) the finally scheduled CG index or (last) signaled DL point-DAI value if the DL c-DAI is point-DAI (or if there is no signaling for the DL c-DAI) (alternatively, the UE regards the received UL c-DAI value as a scheduled CG index or a corresponding DL point-DAI value) (hereinafter, UL point-DAI).

In addition, the UL c-DAI may be configured to indicate only a specific part of the total DL c-DAI values (in the case of the count-DAI), and at least the maximum value of the DL c-DAI may be included in some specific DL c-DAI values. For example, assuming that the DL c-DAI can have N values from 1 to N (>4) and the UL c-DAI is set to 4 values, one of the four values DL c-DAI=1, 2, 4, N may be signaled through the UL c-DAI.

Meanwhile, in the present invention, for the total-DAI signal signaled through the DG DCI and/or the UL count-DAI signaled through the UG DCI, the base station may signal a specific value (hereinafter, Ntot) (not separately defined) through the DG DCI and/or the UG DCI. In this case, the UE may recognize the value of Ntot as the total of the scheduling numbers (from the base station) in all the cells (or SFs) constituting CA or the last scheduling counter value, and configure/transmit the corresponding A/N payload. For example, when 2-bit Ntot is considered, state 00 may indicate k×(4n+1), state 01 may indicate k×(4n+2), state 10 may indicate k×(4n+3), and state 11 may indicate k×(4n+4). Here, n=0, 1, . . . , and k>1. Accordingly, the UE may consider the minimum total value greater than or equal to the (maximum) counter value last received by the UE among the values (hereinafter, total values) indicated by Ntot as the total of scheduling numbers (from the base station) in all the cells (SFs) constituting the CA, and configure/transmit the corresponding A/N payload. The value of k may be set by the base station.

In FDD, the UL count-DAI may not be signaled over UG DCI transmitted through the CSS. The UL counter-DAI may be signaled only over UG DCI transmitted through the USS. In TDD, the UL counter-DAI may be signaled over both UG DCIS transmitted through the CSS and the USS. In this case, the UL counter-DAI may be signaled through the existing t-DAI field.

In the case of a PUSCH that is not scheduled from UG DCI including UL c-DAI (e.g., a PUSCH scheduled based on the SPS (or CSS) or a PUSCH retransmitted without corresponding DCI), the UE may configure and transmit an A/N payload, assuming/considering the (maximum) total-DAI value or the (last) point-DAI value received from the DG DCI as UL c-DAI. When the counter-DAI is independently applied to each CG, a UL c-DAI value for a plurality of CGs may be signaled through one UG DCI. The UL c-DAI for each CG may signal only whether there is DL scheduling for each CG (or whether there is A/N feedback corresponding to each CG) (in order to reduce DCI overhead). Here, the CGs may be configured according to a specific criterion. For example, cell(s) having the same maximum number of transmittable TBs or cell(s) having the same carrier type (e.g., LCell or UCell) may be bundled into a CG. In addition, when the total-DAI or point-DAI is signaled through the DG DCI, separate UL c-DAI signaling (and field configuration therefor) may be omitted from the UG DCI. In this case, the UE may configure/transmit a corresponding A/N payload, assuming/considering the (maximum) total-DAI value or the (last) point-DAI value received from the DG DCI for all PUSCHs as the UL c-DAI.

With the proposed method, the A/N payload may be effectively reduced the even on an existing PUSCH that does not allow reduction of the A/N payload size (e.g., a PUSCH that is not scheduled from UG DCI including UL c-DAI (e.g., a PUSCH scheduled based on the SPS (or CSS), a PUSCH retransmitted without corresponding DCI, or any PUSCH in FDD)). In addition, through this operation, UL-SCH and/or UCI transmission performance on the PUSCH may be improved.

Meanwhile, as the DL transmission mode (TM) is independently configured for each cell, the maximum number of transmittable TBs, Nt, may be set differently for each cell (e.g., coexistence of a cell with Nt=2 and a cell with Nt=1). In this situation, when the count-DAI signals the scheduling order (counter) value in units of cell/SF, if the UE fails to detect the DG DCI having the count-DAI, the UE cannot correctly recognize a cell corresponding to the count-DAI and the TM (i.e., the value of Nt) set for the cell. Thereby, inconsistency may occur between the UE and the base station in determining the number of A/N bits corresponding to the counter-DAI. In consideration of such a problem, when Nt is set differently for each cell (e.g., a cell with Nt=2 exists), the count-DAI may signal the scheduling order (counter) value in units of cell/SF, and the number of A/N bits corresponding to each cell/SF may be allocated so as to be equal to the maximum value of Nt, namely, i.e., max−Nt (e.g., max−Nt=2), irrespective of the TM of the cell.

In the above situation, the total number of A/N bits (tot-Ns)×(max−Nt) corresponding to tot-Ns may exceed the maximum number of A/N bits, i.e., max−Na, given when the number of A/N bits is allocated according to the original cell-specific TM, i.e., Nt. Here, tot-Ns denotes the total number of scheduled cells/SFs inferred from the scheduling counter value corresponding to the last counter-DAI or the total-DAI (and/or the UL count-DAI signaled through the UG DCI). In addition, max−Na denotes the total number of A/N bits allocated to all cells when A/N bits corresponding to the total number of SFs in the bundling window of the corresponding cell are allocated to each cell based on Nt set for the corresponding cell. If (tot−Ns)×(max−Nt)>max−Na or (tot−Ns)×(max−Nt)>max−Na, the UE may configure only A/N bits corresponding to max−Na in an A/N payload such that the A/N bits are mapped to the A/N payload in order of cell/SF indexes rather than in order of counter-DAIS. On the other hand, if (tot−Ns)×(max−Nt)≤max−Na or (tot−Ns)×(max−Nt)<max−Na, the UE may configure only A/N bits corresponding to (tot−Ns)×(max−Nt) in an A/N payload such that the A/N bits are mapped to the A/N payload in order of counter-DAIs.

(2) A/N Payload Configuration Based on DL/UL c-DAI

A method of configuring an A/N payload on a PUCCH/PUSCH when the DL/UL c-DAI signaling scheme is applied (particularly, in TDD) is discussed. In TDD, 1) the t-DAI and the c-DAI may be signaled simultaneously (hereinafter, referred to as a case with t-DAI), or 2) only the c-DAI may be signaled without signaling of the t-DAI (hereinafter, referred to as a case w/o t-DAI). In the latter case, the c-DAI (rather than the t-DAI) may be signaled through the DAI field in an existing DCI format. Hereinafter, a method of configuring an A/N payload on a PUCCH/PUSCH according to presence/absence of t-DAI signaling, the DL c-DAI signaling scheme, and presence/absence of the UL c-DAI will be discussed. A/N transmission on the PUCCH may be included in a case without UL c-DAI, which will be described below.

(a) When Both DL Count-DAI and UL Count-DAI are Present

1) A Case with t-DAI (i.e., when Both DL t-DAI/UL t-DAI are Present)

To configure an A/N payload, A/Ns corresponding to DL c-DAI values from 1 to UL c-DAI may be arranged along the cell-axis in order of the DL c-DAI values (assuming that the initial values of the DL c-DAI and the DL t-DAI are 1), and A/Ns corresponding to DL t-DAI values from 1 to UL t-DAI (for each cell) may be arranged along the SF-axis in order of the DL t-DAI values (for all DL c-DAI values regardless of the value of M for each cell). This is because, when the UE misses a specific DL c-DAI (DG DCI including the DL c-DAI), inconsistency between the UE and the base station may occur in terms of the value of M set for a cell corresponding to the DL c-DAI. A DL c-DAI and a DL t-DAI that are not detected/received may be processed as NACK or DTX.

2) A Case w/o t-DAI (i.e., when there is No DL/UL t-DAI)

To configure an A/N payload, A/Ns corresponding to DL c-DAI values from 1 to UL c-DAI may be arranged along the cell-axis in order of the DL c-DAI values, and A/Ns corresponding to DL SFs from the first DL SF to the max-M-th DL SF (for each cell) may be arranged in order of the DL SFs (for all DL c-DAI values regardless of the value of M for each cell) along the SF-axis. max-M may be the maximum value among the M values set for all the cells. This is because, when the UE misses a specific DL c-DAI (DG DCI including the DL c-DAI), inconsistency between the UE and the base station may occur in terms of the value of M corresponding to the DL c-DAI. A DL c-DAI and a DL SF that are not detected/received may be processed as NACK or DTX.

(B) When DL Count-DAI is Present and UL Count-DAI is not Present

1) A Case with t-DAI (i.e., when there is DL t-DAI and No UL t-DAI)

To configure an A/N payload, A/Ns corresponding to the values from 1 to the greatest value among the received DL c-DAIs, a specific (preset) DL c-DAI having a value greater than or equal to the greatest value, or the maximum value that the DL c-DAI may have may be arranged in order of the DL c-DAI values along the cell-axis, and A/Ns corresponding to DL t-DAI values from 1 to max-M (for each cell) may be arranged in order of the DL t-DAI values (for all DL c-DAI values regardless of the value of M for each cell) along the SF-axis. A DL c-DAI and a DL t-DAI that are not detected/received may be processed as NACK or DTX.

2) A Case w/o t-DAI (i.e., when there is No DL/UL t-DAI)

To Configure an A/N Payload, A/Ns Corresponding to the Values from 1 to the greatest value among the received DL c-DAIs, a specific (preset) DL c-DAI having a value greater than or equal to the greatest value, or the maximum value that the DL c-DAI may have may be arranged in order of the DL c-DAI values along the cell-axis, and A/Ns corresponding to DL SFs from the first DL SF to the max-M-th DL SF (for each cell) may be arranged in order of the DL SFs (for all DL c-DAI values regardless of the value of M for each cell) along the SF-axis. A DL c-DAI and a DL SF that are not detected/received may be processed as NACK or DTX.

(c) When there is UL Point-DAI Regardless of Presence/Absence of DL Point-DAI

1) A Case with t-DAI (i.e., when Both DL/UL t-DAIS are Present)

To configure an A/N payload, A/Ns corresponding to the CGs indicated by the UL c-DAI may be arranged in order of cell indexes along the cell-axis, and A/Ns corresponding to the DL t-DAI values from 1 to min (UL t-DAI, M) (for each cell) may be arranged in order of the DL t-DAI values along the SF-axis. A cell and a DL t-DAI that are not detected/received may be processed as NACK or DTX.

2) A Case w/o t-DAI (i.e., when there is No DL/UL t-DAI)

To configure an A/N payload, A/Ns corresponding to the CGs indicated by the UL c-DAI may be arranged in order of cell indexes along the cell-axis, and A/Ns corresponding to the DL SFs from the first DL SF to the M-th DL SF (for each cell) may be arranged in order of the DL SFs along the SF-axis. A cell and a DL SF that are not detected/received may be processed as NACK or DTX.

(d) When there is a DL Point-DAI and No UL Point-DAI

1) A Case with t-DAI (i.e., when there is DL t-DAI and No UL t-DAI)

To configure an A/N payload, A/Ns corresponding to a CG having the largest number of cells among the CGs indicated by the DL c-DAI or corresponding to all the cells may be arranged in order of cell indexes along the cell-axis, and A/Ns corresponding to DL t-DAI values from 1 to M (for each cell) may be arranged in order of the DL t-DAI values along the SF-axis. A cell and a DL t-DAI that are not detected/received may be processed as NACK or DTX.

2) A Case w/o t-DAI (i.e., when there is No DL/UL t-DAI)

To configure an A/N payload, A/Ns corresponding to a CG having the largest number of cells among the CGs indicated by the DL c-DAI or corresponding to all the cells may be arranged in order of cell indexes along the cell-axis, and A/Ns corresponding to DL SFs from the first DL SF to the M-th DL SF (for each cell) may be arranged in order of the DL SFs along the SF-axis. A cell and a DL SF that are not detected/received may be processed as NACK or DTX.

Meanwhile, an ARO (ACK/NACK Resource Offset) for indicating an offset for implicit PUCCH (format 1a/1a) resource indexes (see Equation 1) linked to EPDCCH transmission resources may be added to the DG DCI corresponding to the cell for which EPDCCH-based scheduling is configured. However, in the method of transmitting an A/N based on explicit PUCCH resources such as PF3/PF4 configured through RRC, the ARO in the DG DCI corresponding to the remaining SCells except the PCell is actually used for no purpose. Accordingly, a counter-DAI, a point-DAI or a total-DAI (or information indicating the total scheduling number or the last scheduling corresponding thereto) may be signaled through the ARO field in the DG DCI corresponding to the SCell for which EPDCCH-based scheduling is configured.

In this embodiment, the counter-DAI and/or total-DAI may be used as a TB-level counter-DAI and/or total-DAI indicating the scheduling position of a scheduled TB and the total number of scheduled TBs, rather than as a cell-level DAI indicating the scheduling positions of scheduled cells or the total number of scheduled cells. Even when the counter-DAI is independently applied to each CG, the counter-DAI (and/or total-DAI) related proposals of the present invention may be employed. Here, the CGs may be configured according to a specific criterion. For example, cell(s) having the same maximum number of transmittable TBs or cell(s) having the same carrier type (e.g., LCell or UCell) may be bundled into a CG.

Figure 20:
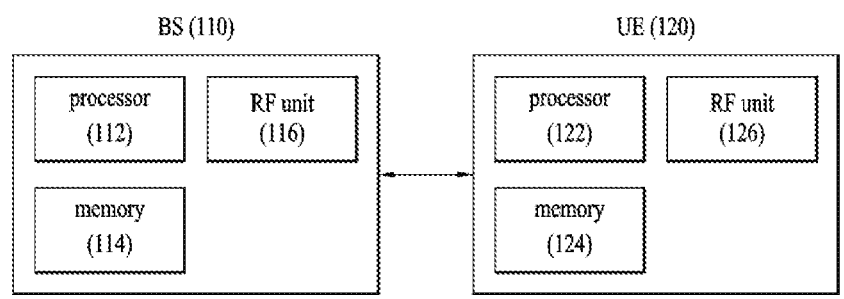
FIG. 20 exemplarily shows a Base Station (BS) and a user equipment (UE) applicable to the embodiments of the present invention.

FIG. 20 illustrates a BS, a relay and a UE applicable to the present invention.

Referring to FIG. 20, a wireless communication system includes a BS 110 and a UE 120. When the wireless communication system includes a relay, the BS or UE may be replaced by the relay.

The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the BS may be performed by an upper node of the BS as the case may be. In other words, it will be apparent that various operations performed for communication with the UE in the network which includes a plurality of network nodes along with the BS may be performed by the BS or network nodes other than the BS. The BS may be replaced with terms such as fixed station, Node B, eNode B (eNB), and access point. Also, the term UE may be replaced with terms such as UE (MS) and mobile subscriber station (MSS).

The embodiments according to the present invention may be implemented by various means, for example, hardware, firmware, software, or combinations thereof. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a UE, BS or other devices of a wireless mobile communication system. Specifically, the present invention is applicable to a method for transmitting uplink control information and an apparatus for the same.

What is claimed is:

1. A method for receiving a hybrid automatic repeat request (HARQ-ACK) payload by a base station in a carrier aggregation (CA) wireless communication system, the method comprising:
   transmitting a first physical downlink control channel (PDCCH) for downlink scheduling through one of plural cells in a time interval, the first PDCCH including a first downlink assignment index (DAI) and a second DAI;
   transmitting a downlink data based on the first PDCCH; and
   receiving the HARQ-ACK payload including HARQ-ACK information for the downlink data generated by a user equipment (UE) based on the first and second DAIS,
   wherein the first DAI is related to a counter value of the downlink scheduling, the counter value being counted in a cell prioritized manner in a unit of {cell, time interval} pair, and
   wherein the second DAI indicates a total number of downlink scheduling(s) over the plural cells, up to a current time interval within a set of time intervals, the total number being updated from time interval to time interval, and the second DAI has a same value as other second DAIS corresponding to a plurality of first PDCCHs and received in a same time interval.

2. The method according to claim 1, wherein the first PDCCH is transmitted in a UE-specific search space (USS) within the set of time intervals.

3. The method of claim 2, further comprising:
   transmitting a second PDCCH in a common search space (CSS) within the set of time intervals, wherein the second PDCCH does not contain the second DAI.

4. The method according to claim 1, wherein the first PDCCH is (i) a PDCCH for scheduling a physical downlink shared channel (PDSCH) or (ii) a PDCCH indicating a semi-persistent scheduling release (SPS release).

5. The method according to claim 4, wherein the HARQ-ACK payload comprises an HARQ-ACK response to the PDSCH or an HARQ-ACK response to the PDCCH indicating the SPS release.

6. The method according to claim 1, wherein the set of time intervals consists of SF #n-k, and an uplink (UL) subframe is a subframe #n, wherein K: $\{k_0, k_1, \ldots k_{M-1}\}$ is given per cell as follows:

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

7. The method according to claim 1, wherein the cell prioritized manner includes: downlink scheduling is counted in order of increasing time interval index after increasing a cell index within the set of time intervals.

8. The method according to claim 1, wherein the set of time intervals includes a bundling window of downlink (DL) subframes.

9. A base station configured to receive a hybrid automatic repeat request (HARQ-ACK) payload in a carrier aggregation (CA) wireless communication system, the base station comprising:
a radio frequency (RF) unit; and
a processor,
wherein the processor is configured to:
transmit a first physical downlink control channel (PDCCH) for downlink scheduling through one of plural cells in a time interval, the first PDCCH including a first downlink assignment index (DAI) and a second DAI;
transmit a downlink data based on the first PDCCH; and
receive the HARQ-ACK payload including HARQ-ACK information for the downlink data generated by a user equipment (UE) based on the first and second DAIs,
wherein the first DAI is related to a counter value of the downlink scheduling, the counter value being counted in a cell prioritized manner in a unit of {cell, time interval} pair, and wherein the second DAI is related to a total number of downlink scheduling(s) over the plural cells, up to a current time interval within a set of time intervals, the total number being updated from time interval to time interval, and the second DAI has a same value as other second DAIs corresponding to a plurality of first PDCCHs and received in a same time interval.

10. The base station according to claim 9, wherein the first PDCCH is transmitted in a UE-specific search space (USS) within the set of time intervals.

11. The base station according to claim 10, wherein the processor is further configured to transmit a second PDCCH in a common search space (CSS) within the set of time intervals, wherein the second PDCCH does not contain the second DAI.

12. The base station according to claim 9, wherein the first PDCCH is (i) a PDCCH for scheduling a physical downlink shared channel (PDSCH) or (ii) a PDCCH indicating a semi-persistent scheduling release (SPS release).

13. The base station according to claim 12, wherein the HARQ-ACK payload comprises an HARQ-ACK response to the PDSCH or an HARQ-ACK response to the PDCCH indicating the SPS release.

14. The base station according to claim 9, wherein the set of time intervals consists of SF #n-k, and an uplink (UL) subframe is a subframe #n, wherein K: $\{k_0, k_1, \ldots k_{M-1}\}$ is given per cell as follows:

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

15. The base station according to claim 9, wherein the cell prioritized manner includes: downlink scheduling is counted in order of increasing time interval index after increasing a cell index within the set of time intervals.

16. The base station according to claim 9, wherein the set of time intervals includes a bundling window of downlink (DL) subframes.

* * * * *